US009306980B2

(12) United States Patent
Shimizu

(10) Patent No.: US 9,306,980 B2
(45) Date of Patent: Apr. 5, 2016

(54) IMAGE PROCESSING APPARATUS THAT CONFIGURES SETTINGS OF INFORMATION SECURITY POLICY, METHOD OF CONTROLLING THE SAME, PROGRAM, AND STORAGE MEDIUM

(71) Applicant: CANON KABUSHIKI KAISHA, Tokyo (JP)

(72) Inventor: Shota Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/119,096

(22) PCT Filed: Aug. 1, 2013

(86) PCT No.: PCT/JP2013/071439
§ 371 (c)(1),
(2) Date: Nov. 20, 2013

(87) PCT Pub. No.: WO2014/024947
PCT Pub. Date: Feb. 13, 2014

(65) Prior Publication Data
US 2015/0046970 A1    Feb. 12, 2015

(30) Foreign Application Priority Data

Aug. 6, 2012  (JP) ................. 2012-173941

(51) Int. Cl.
*H04L 29/06*   (2006.01)
*G06F 21/62*   (2013.01)
*H04N 1/00*    (2006.01)
*H04N 1/32*    (2006.01)
*H04N 1/44*    (2006.01)

(52) U.S. Cl.
CPC .............. *H04L 63/20* (2013.01); *G06F 21/629* (2013.01); *H04N 1/00875* (2013.01); *H04N 1/32144* (2013.01); *H04N 1/448* (2013.01); *H04N 2201/0094* (2013.01)

(58) Field of Classification Search
CPC ......... H04L 63/10; H04L 63/20; G06F 21/00; G06F 21/629; H04N 1/00875; H04N 1/32144; H04N 1/448
USPC ............................................................ 726/1
See application file for complete search history.

(56) References Cited

U.S. PATENT DOCUMENTS 8,570,547 B2 * 10/2013 Taniguchi ................. 358/1.14
2007/0006280 A1 *  1/2007 Takahashi ..................... 726/1
2008/0013727 A1 *  1/2008 Uemura ..................... 380/243

(Continued)

FOREIGN PATENT DOCUMENTS

| JP | 2008-219419 A |   | 9/2008 |            |
|----|---------------|---|--------|------------|
| JP | 2008-288686 A | * | 11/2008 | ............. H04N 1/387 |
| JP | 2011-097527 A | * | 5/2011  | ............. H04L 9/32 |

OTHER PUBLICATIONS

International Search Report issued in PCT/JP2013/071439, Mailed Oct. 22, 2013.

*Primary Examiner* — Michael S McNally
(74) *Attorney, Agent, or Firm* — Rossi, Kimms & McDowell LLP

(57) ABSTRACT

An image processing apparatus which enables a user to change the user mode while maintaining the state compliant with the information security policy. A network communication section receives security policy data in which information security policy is described from an external apparatus. A CPU identifies an operation mode of the image processing apparatus based on the received security policy. The CPU configures the identified operation mode such that the information security policy is satisfied.

16 Claims, 20 Drawing Sheets

(56) References Cited

U.S. PATENT DOCUMENTS

| | | | |
|---|---|---|---|
| 2008/0034403 A1* | 2/2008 | Kakigi | 726/1 |
| 2009/0282459 A1* | 11/2009 | Kitani | 726/1 |
| 2010/0095349 A1* | 4/2010 | Motoyama | 726/1 |
| 2010/0186063 A1* | 7/2010 | Oba et al. | 726/1 |

* cited by examiner

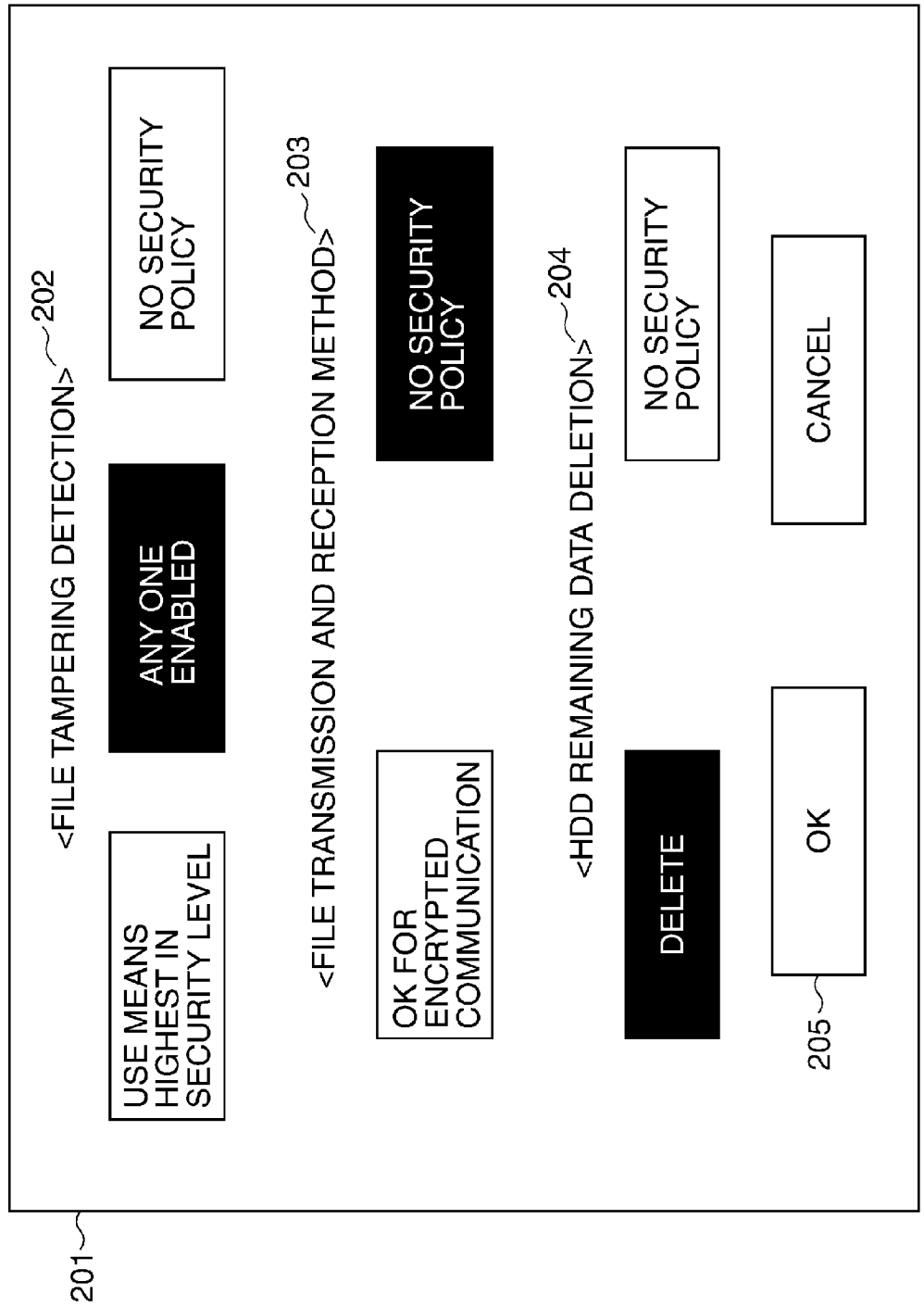

FIG.4A

SECURITY POLICY DATA (PC) ~302      ~301   ~303

| NAME OF INFORMATION SECURITY POLICY | VALUE OF INFORMATION SECURITY POLICY |
|---|---|
| FILE TAMPERING DETECTION | ANY ONE ENABLED |
| FILE TRANSMISSION AND RECEPTION METHOD | NO SECURITY POLICY |
| HDD REMAINING DATA DELETION | DELETE |

FIG.4B

CONVERSION RULE FILE (MULTIFUNCTION PERIPHERAL)   ~501   ~502

| RULE PART | NAME OF INFORMATION SECURITY POLICY | NAME OF ASSOCIATED USER MODE | |
|---|---|---|---|
| | FILE TAMPERING DETECTION | PDF WITH FORCED DIGITAL SIGNATURE | |
| | | PDF WITH FORCED HASH | |
| | FILE TRANSMISSION AND RECEPTION METHOD | FTP | |
| | | SFTP | |

| CONDITION PART | NAME OF INFORMATION SECURITY POLICY | SETTABLE VALUE OF SECURITY POLICY | CONDITION FOR DETERMINING WHETHER COMPLYING WITH INFORMATION SECURITY POLICY |
|---|---|---|---|
| | FILE TAMPERING DETECTION | USE MEANS HIGHEST IN SECURITY LEVEL | PDF WITH FORCED DIGITAL SIGNATURE: ON |
| | | ANY ONE ENABLED | PDF WITH FORCED DIGITAL SIGNATURE: ON OR PDF WITH FORCED HASH: ON |
| | | NO SECURITY POLICY | NONE |
| | FILE TRANSMISSION AND RECEPTION METHOD | OK FOR ENCRYPTED COMMUNICATION | FTP: OFF AND ALSO SFTP: ON |
| | | NO SECURITY POLICY | NONE |

INTERMEDIATE INFORMATION (MULTIFUNCTION PERIPHERAL)

| | | ~601 |
|---|---|---|
| PDF WITH FORCED DIGITAL SIGNATURE | ANY ONE ENABLED | |
| PDF WITH FORCED HASH | | |
| FTP | NO SECURITY POLICY | |
| SFTP | | |

FIG.7A

| PDF WITH FORCED DIGITAL SIGNATURE | OFF |
|---|---|
| PDF WITH FORCED HASH | OFF |
| FTP | ON |
| SFTP | ON |

FIG.7B

| PDF WITH FORCED DIGITAL SIGNATURE | ANY ONE ENABLED | PDF WITH FORCED DIGITAL SIGNATURE: ON OR PDF WITH FORCED HASH: ON |
|---|---|---|
| PDF WITH FORCED HASH | | |

FIG.8A

<ERROR!>

INCAPABLE OF SETTING FOLLOWING SECURITY POLICY:
・HDD REMAINING DATA DELETION

<CAUTION! >

SECURITY POLICY IS VIOLATED.
RECONSIDER SETTINGS OF THE FOLLOWING:
・PDF WITH FORCED DIGITAL SIGNATURE
・PDF WITH FORCED HASH

FIG.8B

<CAUTION! >

DEVICE IS NOT PERMITTED TO BE USED
DUE TO VIOLATION OF SECURITY POLICY.

RECONSIDER SETTINGS OF THE FOLLOWING:
・PDF WITH FORCED DIGITAL SIGNATURE
・PDF WITH FORCED HASH

FIG.16

CONVERSION RULE FILE (APPARATUS TYPE: aaa) ~1601

<table>
<tr><td rowspan="4">RULE PART</td><td colspan="2">NAME OF INFORMATION SECURITY POLICY</td><td colspan="2">NAME OF ASSOCIATED USER MODE</td></tr>
<tr><td colspan="2" rowspan="2">FILE TAMPERING DETECTION</td><td colspan="2">PDF WITH FORCED DIGITAL SIGNATURE</td></tr>
<tr><td colspan="2">PDF WITH FORCED HASH</td></tr>
<tr><td colspan="2" rowspan="2">FILE TRANSMISSION AND RECEPTION METHOD</td><td colspan="2">FTP</td></tr>
<tr><td></td><td colspan="2"></td><td colspan="2">SFTP</td></tr>
<tr><td rowspan="6">CON-DITION PART</td><td>NAME OF INFORMATION SECURITY POLICY</td><td>SETTABLE VALUE OF SECURITY POLICY</td><td colspan="2">CONDITION FOR DETERMINING WHETHER COMPLYING WITH INFORMATION SECURITY POLICY</td></tr>
<tr><td rowspan="3">FILE TAMPERING DETECTION</td><td>USE MEANS HIGHEST IN SECURITY LEVEL</td><td colspan="2">PDF WITH FORCED DIGITAL SIGNATURE: ON</td></tr>
<tr><td>ANY ONE ENABLED</td><td colspan="2">PDF WITH FORCED DIGITAL SIGNATURE: ON OR<br>PDF WITH FORCED HASH: ON</td></tr>
<tr><td>NO SECURITY POLICY</td><td colspan="2">NONE</td></tr>
<tr><td rowspan="2">FILE TRANSMISSION AND RECEPTION METHOD</td><td>OK FOR ENCRYPTED COMMUNICATION</td><td colspan="2">FTP: OFF AND ALSO SFTP: ON</td></tr>
<tr><td>NO SECURITY POLICY</td><td colspan="2">NONE</td></tr>
</table>

(APPARATUS TYPE: bbb)

<table>
<tr><td rowspan="5">RULE PART</td><td colspan="2">NAME OF INFORMATION SECURITY POLICY</td><td colspan="2">NAME OF ASSOCIATED USER MODE</td></tr>
<tr><td colspan="2" rowspan="2">FILE TAMPERING DETECTION</td><td colspan="2">PDF WITH FORCED DIGITAL SIGNATURE</td></tr>
<tr><td colspan="2">PDF WITH FORCED HASH</td></tr>
<tr><td colspan="2" rowspan="2">FILE TRANSMISSION AND RECEPTION METHOD</td><td colspan="2">FTP</td></tr>
<tr><td colspan="2">SFTP</td></tr>
<tr><td colspan="2">HDD REMAINING DATA DELETION</td><td colspan="2">HDD COMPLETE DELETION</td></tr>
<tr><td rowspan="8">CON-DITION PART</td><td>NAME OF INFORMATION SECURITY POLICY</td><td>SETTABLE VALUE OF SECURITY POLICY</td><td colspan="2">CONDITION FOR DETERMINING WHETHER COMPLYING WITH INFOR-MATION SECURITY POLICY</td></tr>
<tr><td rowspan="3">FILE TAMPERING DETECTION</td><td>USE MEANS HIGHEST IN SECURITY LEVEL</td><td colspan="2">PDF WITH FORCED DIGITAL SIGNATURE: ON</td></tr>
<tr><td>ANY ONE ENABLED</td><td colspan="2">PDF WITH FORCED DIGITAL SIGNATURE: ON OR<br>PDF WITH FORCED HASH: ON</td></tr>
<tr><td>NO SECURITY POLICY</td><td colspan="2">NONE</td></tr>
<tr><td rowspan="2">FILE TRANSMISSION AND RECEPTION METHOD</td><td>OK FOR ENCRYPTED COMMUNICATION</td><td colspan="2">FTP: OFF AND ALSO WebDAV: OFF</td></tr>
<tr><td>NO SECURITY POLICY</td><td colspan="2">NONE</td></tr>
<tr><td rowspan="2">HDD REMAINING DATA DELETION</td><td>DELETION</td><td colspan="2">HDD COMPLETE DELETION: ON</td></tr>
<tr><td>NO SECURITY POLICY</td><td colspan="2">NONE</td></tr>
</table>

```
<?xml version="1.0" encoding="UTF-8" ? >
<security policy>
    <file tampering detection value ="any one enabled"/>
    <file transmission reception method value ="no security policy"/>
    <HDD remaining data deletion value ="delete"/>
</security policy>
```

FIG.21

```xml
<?xml version="1.0" ?>
<policy conversion rule>
  <file tampering detection>
    <associated user mode>
      <PDF with forced digital signature/>
      <PDF with forced hash/>
    </associated user mode>
    <rule>
      <use means highest in security level>
        <condition>forced digital signature==ON</condition>
      </use means highest in security level>
      <any one enabled>
        <condition>(forced digital signature==ON)
        ||(PDF with forced hash==ON)</condition>
      </any one enabled>
      <no security policy>
        <condition/>
      <no security policy>
    </rule>
  </file tampering detection>
  <file transmission reception method>
    <associated user mode>
      <ftp/>
      <sftp/>
    </associated user mode>
    <rule>
```

IMAGE PROCESSING APPARATUS THAT CONFIGURES SETTINGS OF INFORMATION SECURITY POLICY, METHOD OF CONTROLLING THE SAME, PROGRAM, AND STORAGE MEDIUM

TECHNICAL FIELD

The present invention relates to an image processing apparatus that configures settings of information security policy, a method of controlling the same, a program, and a storage medium, and more particularly to a technique related to information security policy for apparatuses under a network environment.

BACKGROUND ART

It is preferable that personal computers (PCs) and server apparatuses (file server and authorization server) connected to a network in an office or the like are operated according to information security policy decided on an office-by-office basis. Information security policy refers to a basic policy concerning the information security of an entire company, and comprises a collection of policy items for the use of information, prevention of intrusion from outside, and leakage of information.

Apparatuses connected to an office network include not only PCs and server apparatuses, but also peripheral apparatuses, such as multifunction peripherals and printers. Recent multifunction peripherals not only simply print or transmit images but also store image data to thereby provide a file server function to PCs and play roles similar to those of server apparatuses existing on the network.

To maintain a safe and secure office environment, similarly to the PCs and server apparatuses, multifunction peripherals as well are demanded to comply with the information security policy. What is meant by "to comply with the information security policy", is, for the purpose of prevention of malicious access to multifunction peripherals installed in an office and information leakage, that each multifunction peripheral has restrictions provided on operations thereof from the viewpoint of security, including a restriction of being absolutely required to go through user authentication before the multifunction peripheral is permitted to be operated and a restriction of being absolutely required to encrypt a communication path used by the multifunction peripheral.

For causing PCs and server apparatuses to comply with the information security policy, there is employed a method of distributing OS (operating system)-dependent settings to the PCs and server apparatuses. For example, an OS-dependent setting concerning the encryption of a communication path includes e.g. "permit non SSL connection", and PCs are managed such that PCs of any PC venders are uniformly caused to comply with the information security policy.

On the other hand, multifunction peripherals have different items of settings between venders, and hence it is impossible to employ a method for uniformly causing the multifunction peripherals to comply with the information security policy by distributing the settings as in the case of PCs and server apparatuses. Therefore, an administrator is required to configure, after becoming familiar with a large number of operation settings (hereafter referred to as "user modes") of each of multifunction peripherals, the settings of the multifunction peripherals, on a multifunction peripheral-by-multifunction peripheral basis, such that they are made compliant with the information security policy. This demands the administrator to expend enormous efforts. For example, the setting of a user mode in which encryption of a communication path is performed can be "use SSL" for a multifunction peripheral manufactured by A company, while for a multifunction peripheral manufactured by B company, the same can be "encrypt HTTP communication". Conventionally, this makes it impossible to cause the multifunction peripherals to uniformly comply with the information security policy, and hence, after becoming familiar with user mode settings of multifunction peripherals of various venders, the administrator works to configure the settings of multifunction peripherals on a multifunction peripheral-by-multifunction peripheral basis to make them compliant with the information security policy. Further, unless the settings are properly configured, it practically permits operations not complying with the information security policy, which can be a threat to security of the office.

To eliminate this inconvenience, there has been proposed a system in which an administrator performs inputs complying with the information security policy to thereby create and distribute user modes for a plurality of multifunction peripherals (see e.g. the following PTL 1). The administrator answers questions displayed on a configuration screen on the PC, in compliance with the information security policy. The system having received the answers from the administrator creates, based on the answers, settings which are not dependent on multifunction peripherals (hereinafter referred to as "security policy data"), and converts the created security policy data to respective user modes which are dependent on multifunction peripherals to which associated user modes are to be distributed, respectively. By thus distributing the user modes, the system places different multifunction peripherals in respective states complying with the information security policy, without knowledge of the multifunction peripherals.

CITATION LIST

Patent Literature

PTL 1: JP 2008-219419 A

SUMMARY OF INVENTION

Technical Problem

In some cases, a system is desirable which can change the user mode while maintaining the state compliant with the information security policy. For example, in a case where the information security policy makes it an absolute requirement to encrypt a communication path, let it be assumed that the multifunction peripheral is compatible with "use SSL" and "use IPSEC" and by enabling one of these, it is possible to place the multifunction peripheral in the state compliant with the information security policy. Under such conditions, according to the conventional system, if a setting enabling "use IPSEC" is distributed, the user cannot change the setting even if he/she desires to enable "use SSL". To change the setting, the user is required to request the administrator to retransmit a user mode complying with the information security policy, which lacks user-friendliness.

The present invention provides an image processing apparatus which enables a user to change the user mode while maintaining a state compliant with information security policy, a method of controlling the same, a program, and a storage medium.

Solution to Problem

Accordingly, in a first aspect of the present invention, there is provided an image processing apparatus comprising a reception unit configured to receive security policy data in which information security policy is described from an external apparatus, an identification unit configured to identify an operation mode of the image processing apparatus based on the security policy data received by the reception unit, and a configuration unit configured to configure the identified operation mode such that the information security policy is satisfied.

Accordingly, in a second aspect of the present invention, there is provided a method of controlling an image processing apparatus, comprising receiving security policy data in which information security policy is described from an external apparatus, identifying an operation mode of the image processing apparatus based on the received security policy data, and configuring the identified operation mode such that the information security policy is satisfied.

Accordingly, in a third aspect of the present invention, there is provided a computer-executable program for executing a method of controlling an image processing apparatus, comprising a program code for causing an information processing apparatus to function as a policy creation unit configured to create security policy data in which information security policy is described, and a policy transmission unit configured to transmit the security policy data created by the policy creation unit, and a program code for causing the image processing apparatus to function as a policy reception unit configured to receive the security policy data, a policy conversion unit configured to convert the security policy data received by the policy reception unit according to a user mode to which the image processing apparatus is set, a policy determination unit configured to determine, using the security policy data converted by the policy conversion unit, whether or not the present user mode of the image processing apparatus satisfies the information security policy, and a notification unit configured to, when the policy determination unit determines that the present user mode of the image processing apparatus does not satisfy the information security policy, notify that the setting of the user mode is required to be changed.

Accordingly, in a fourth aspect of the present invention, there is provided a non-transitory computer-readable storage medium storing the computer-executable program.

Advantageous Effects of Invention

According to the present invention, it is possible to change the settings of an image processing apparatus such that the image processing apparatus is made compliant with information security policy, and change the user mode while maintaining the state compliant with the information security policy.

Further features of the present invention will become apparent from the following description of exemplary embodiments with reference to the attached drawings.

BRIEF DESCRIPTION OF DRAWINGS

FIG. 3 A diagram showing an example of a policy configuration screen displayed on an input section of the PC.

FIG. 4A A diagram showing an example of security policy data stored in a storage device of the PC.

FIG. 4B A diagram showing an example of a conversion rule file stored in a conversion rule storage section of the multifunction peripheral.

FIG. 4C A diagram showing an example of intermediate information stored in a RAM of the multifunction peripheral.

FIG. 7A A diagram showing an example of respective names of user modes and values thereof stored in a user mode storage section of the multifunction peripheral.

FIG. 7B A diagram showing an example of screen control information stored in the RAM of the multifunction peripheral.

FIG. 8A A diagram showing an example of a display screen displayed by the PC for notifying an error and a caution to an administrator.

FIG. 8B A diagram showing an example of an error screen displayed by a screen control section of the multifunction peripheral.

FIG. 16 A diagram showing an example of combinations of multifunction peripheral types and conversion rule files stored in a conversion rule storage section of the PC.

FIG. 21 A diagram showing an example of XML description of a policy conversion file appearing in FIG. 4B.

DESCRIPTION OF EMBODIMENTS

The present invention will now be described in detail below with reference to the accompanying drawings showing embodiments thereof.

Figure 1:
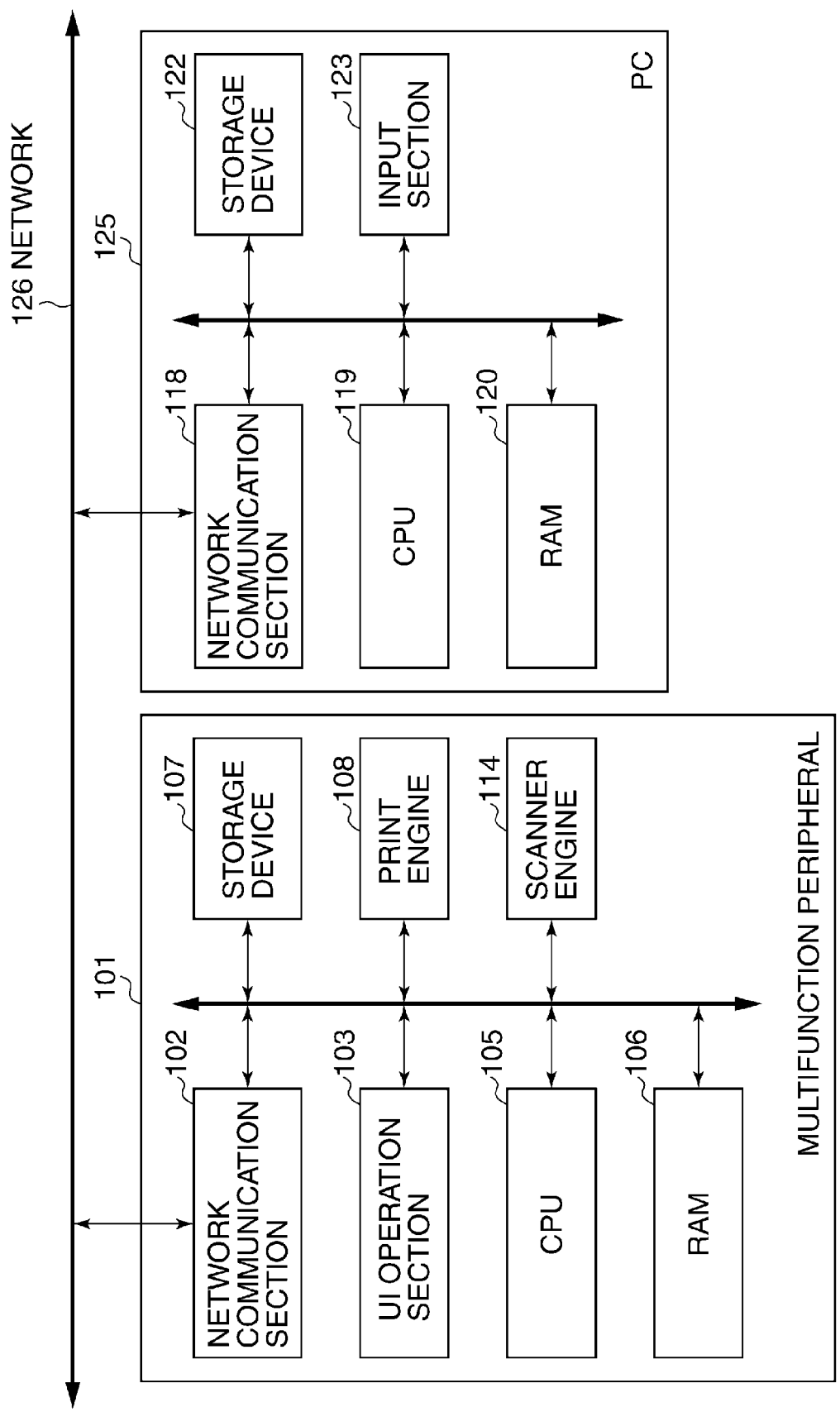
FIG. 1 A schematic block diagram showing the hardware configuration of each of apparatuses forming an information processing system including a multifunction peripheral as an image processing apparatus according to a first embodiment of the present invention.

FIG. 1 is a schematic block diagram showing the hardware configuration of each of apparatuses forming an information processing system including an image processing apparatus according to a first embodiment of the present invention.

In FIG. 1, the information processing system includes a multifunction peripheral 101 as an example of the image processing apparatus, a personal computer (PC) 125 as an example of an information processing apparatus, and a network 126 connecting them. Note that the apparatuses forming the information processing system of the present invention are not limited to those of the illustrated example, but in addition to the illustrated apparatuses, a plurality of apparatuses may be connected to the network 126. Further, the image processing apparatus may be other than the multifunction peripheral, that is, it may be a printer, a scanner, a mobile terminal, or the like.

First, a description will be given of the multifunction peripheral 101.

Reference numeral 102 denotes a network communication section for communicating with external apparatuses including the PC 125 via the network 126. Reference numeral 103 denotes a user interface (UI) operation section for receiving setting operations performed by the user on the multifunction peripheral 101, displaying a state of the multifunction peripheral 101, and enabling the user to operate the multifunction peripheral 101. Reference numeral 105 denotes a CPU that executes image processing on print data and various control operations. Reference numeral 106 denotes a RAM for temporarily storing a program code executed by the CPU 105, information of image data, and so forth. Reference numeral 107 denotes a storage device that stores program codes, image data, and so forth. Reference numeral 108 denotes a print engine that implements a conventionally known technique, such as an electrophotographic technique or an inkjet technique, for printing image data on a paper medium as an actual printing medium. Reference numeral 114 denotes a scanner engine that optically reads an image printed on a paper medium.

With the configuration described above, the copy function of the multifunction peripheral 101 is realized in the following manner: In response to a user's operation on the user interface operation section 103, the CPU 105 reads image data using the scanner engine 114 according to a program code stored in the RAM 106. The read image data is stored into the storage device 107, subjected to necessary image processing, and then output by the print engine 108.

Further, a PDF transmission function is realized in the following manner: In response to a user's operation on the user interface operation section 103, the CPU 105 reads image data from the scanner engine 114 according to a program code stored in the RAM 106. The read image data is stored into the storage device 107, subjected to a predetermined format conversion, and transmitted to a designated address from the network communication section 102.

Next, a description will be given of the PC 125.

Reference numeral 118 denotes a network communication section for communicating with external apparatuses via the network 126. Reference numeral 119 denotes a CPU that executes various control operations. Reference numeral 120 denotes a RAM for temporarily storing information such as a program code executed by the CPU 119. Reference numeral 122 denotes a storage device that stores program codes and data. Reference numeral 123 denotes an input section that receives input to the PC 125 by an administrator. The input section 123 serves as an operation unit and a display unit.

Figure 2A:
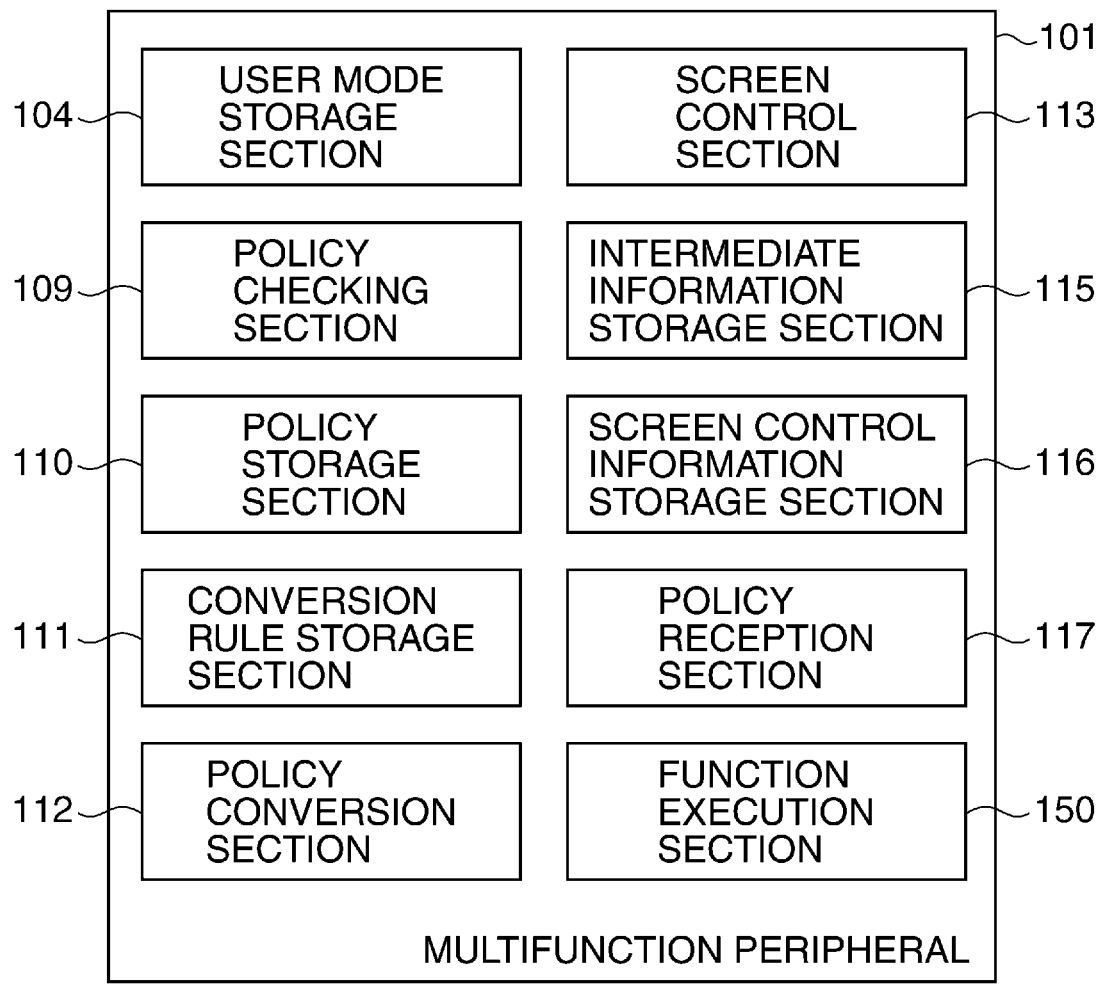
FIG. 2A A schematic block diagram showing a configuration of functions of the multifunction peripheral appearing in FIG. 1, which are related to control of information security policy.
Figure 2B:
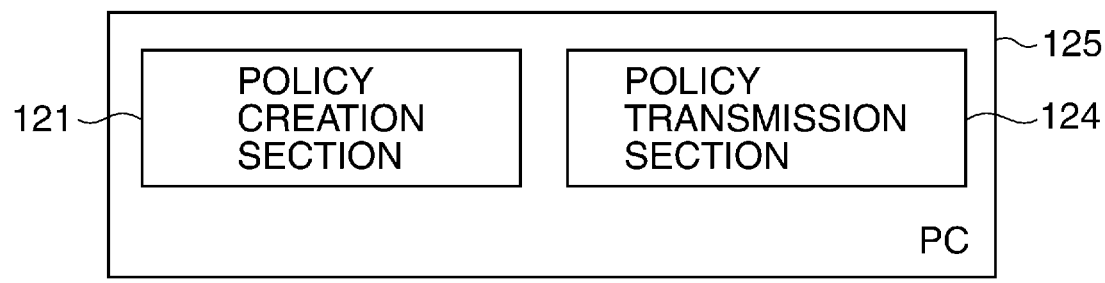
FIG. 2B A schematic block diagram showing a configuration of functions of a PC appearing in FIG. 1, which are related to control of the information security policy.

FIG. 2A is a schematic block diagram showing a configuration of functions of the multifunction peripheral 101 appearing in FIG. 1, which are related to control of information security policy. FIG. 2B is a schematic block diagram showing a configuration of functions of the PC 125 appearing in FIG. 1, which are related to control of the information security policy. Note that description of the present embodiment is given assuming that the illustrated functions are implemented by software, but they may be implemented by hardware.

In FIG. 2A, reference numeral 104 denotes a user mode storage section that stores names and values of items (hereinafter referred to as "the user mode setting items") of user's settings (hereinafter referred to as "the user modes") concerning operations of the multifunction peripheral 101 which are set via the user interface operation section 103. Examples of the user mode setting items include "PDF with forced digital signature" and "PDF with forced hash".

The user mode setting item of "PDF with forced digital signature" is an item for setting a function of forcibly calculating, when a PDF file is created by the multifunction peripheral, a hash value from the PDF file, and adding an electronic signature obtained by encrypting the hash value using a secret key of an author of the file to the PDF file, to thereby create a PDF file which enables verification as to whether the PDF file is created by an author himself/herself.

Note that in a case where the user mode setting item of "PDF with forced digital signature" is enabled, it is also possible to detect tampering of the created file. Further, the user mode setting item of "PDF with forced hash" is an item for setting a function of forcibly calculating, when a PDF file is created, a hash value from the PDF file, and adding the hash value to the PDF file, to thereby create a PDF file which enables detection of tampering thereof.

Further, "FTP" and "SFTP" as well are examples of the user mode setting item. "FTP" is an acronym for "File Transfer Protocol", and is used for executing file transfer over the network. "SFTP" is an acronym for "Secure File Transfer Protocol" and is used for executing file transfer over the network using an encrypted communication by SSH (secure shell). When the user mode setting item of "FTP" or "SFTP" is enabled, it is possible to make use of the function of transferring a file stored in the storage device 107 by FTP or SFTP.

Note that the names and values of respective user modes are stored in the storage device 107 or the like. Reference numeral 110 denotes a policy storage section that stores security policy data transmitted from outside via the network communication section 102 into the storage device 107 or the like. Reference numeral 111 denotes a conversion rule storage section that stores a conversion rule file in which is written information necessary for making a comparison between security policy data and the current values of user modes of the multifunction peripheral 101. Details of the conversion rule file will be described hereinafter.

Reference numeral 112 denotes a policy conversion section corresponding to a policy conversion unit and generates intermediate information for comparing security policy data with the respective values of user modes. Reference numeral 115 denotes an intermediate information storage section implemented by a non-volatile memory, for storing the intermediate information generated by the policy conversion section 112.

Reference numeral 109 denotes a policy checking section corresponding to a policy determination unit, and compares the intermediate information stored in the intermediate information storage section 115 and the respective values of user modes stored in the user mode storage section 104, to thereby perform determination based on conditions written in the conversion rule file. As a result of the determination, if the conditions are not satisfied, the policy checking section 109 generates screen control information for performing screen control. Reference numeral 116 denotes a screen control information storage section that stores the screen control information generated by the policy checking section 109. The screen control information is stored in the storage device 107 or the like.

Further, the policy checking section 109 performs operation control of each application of the multifunction peripheral 101 in addition to above-described checking operation. The multifunction peripheral 101 has various applications executed by a function execution section 150 for providing a transmission function, a printing function, a file server function, etc. The policy checking section 109 causes these applications executed by the function execution section 150 to operate in a manner restricted according to the information security policy or inhibits starting any of them which does not comply with the information security policy.

Note that although not shown in FIG. 2A, the multifunction peripheral 101 has a send module that causes the scanner engine 114 to obtain image data by optically reading a document, forms the image data into an electronic file, and sends the electronic file to a designated address. Further, the multifunction peripheral 101 has a module that executes printing by interpreting PDL code received from the PC 125 or other devices via the network. Further, the multifunction peripheral 101 has a BOX module that stores image data in the storage device 107, a Web browser module that reads information at various Web sites in the Internet or an Intranet by HTTP or HTTPS protocol and displays the information. The policy checking section 109 checks whether these applications comply with the security policy. If an application is determined not to comply with the security policy, the policy checking section 109 generates screen control information or restricts starting of the application.

Note that the applications controlled by the policy checking section 109 include applications which are dynamically added or deleted to or from the multifunction peripheral 101. For example, Canon has already released a commercial product of MEAP (Multifunction Embedded Application Platform) (registered trademark) which is capable of dynamically adding or deleting an embedded application by integrating an execution environment of Java (registered trademark) in the multifunction peripheral 101. An MEAP application which operates in Java (registered trademark) execution environment is also a target to be restricted in operation by the function execution section 150.

Reference numeral 117 is a policy reception section corresponding to a policy reception unit, and stores security policy data received via the network communication section 102 into the policy storage section 110. Reference numeral 113 is a screen control section corresponding to a screen control unit, and performs screen control using the screen control information stored in the screen control information storage section 116.

In the PC 125 shown in FIG. 2B, reference numeral 121 denotes a policy creation section corresponding to a policy creation unit, and creates security policy data based on an administrator's input. Reference numeral 124 denotes a policy transmission section corresponding to a policy transmission unit, and transmits the security policy data created by the policy creation section 121 from the network communication section 118 over the network 126.

Next, a description will be given of three stages of the information security policy control method according to the invention.

In a first stage, the administrator creates, using the PC 125, security policy data for causing the multifunction peripheral 101 to be placed in a state compliant with the information security policy (hereafter simply referred to as "the security policy").

In a second stage, the created security policy data is transmitted from the PC 125 to the multifunction peripheral 101 and is applied thereto, whereby it is determined whether or not the multifunction peripheral 101 is in the state compliant with the security policy, and a result of the determination is notified to the administrator.

Finally, in a third stage, a user uses the multifunction peripheral 101 having the security policy data applied thereto in the state compliant with the security policy.

A description will be given of the first stage in which the administrator creates, using the PC 125, security policy data for causing the multifunction peripheral 101 to be placed in the state compliant with the security policy.

FIG. 3 is a diagram showing an example of a policy configuration screen displayed on the input section 123 of the PC 125, for creating security policy data. Although in the present embodiment, for simplicity, description will be given only of a case where there items of the information security policy of file tampering detection, file sharing, and HDD remaining data deletion are set, in actuality, there may be set many more items of information security policy. Further, although the description is given only of a case in which a value for each item of information security policy is selected using a radio button, in actuality, there may be provided a method of entering a value in a text field or a method enabling selection from a plurality of choices by a check box. Note that hereafter, "an item of information security policy" and "items of information security policy" are referred to as "an information security policy" and "information security policies", respectively, unless it is critically necessary to differentiate between "item or items of information security policy" and "information security policy" defined in Background Art. This also applies to "security policy".

In FIG. 3, the policy configuration screen, denoted by reference numeral 201, is a screen for configuring the settings of the three information security policies: "file tampering detection" 202, "file transmission and reception method" 203, and "HDD remaining data deletion" 204.

The "file tampering detection" 202 is an information security policy designating whether or not a created file requires tampering detection. In the present embodiment, it is possible to select, for this information security policy, one of three values: "use means highest in security level", "any one enabled" and "no security policy". In the illustrated example, the value of "any one enabled" is selected.

The "file transmission and reception method" 203 is an information security policy for designating whether or not the transmission and reception of a file requires the use of encrypted communication. In the present embodiment, it is possible to select, for this information security policy, one of two values: "OK for encrypted communication" and "no security policy". In the illustrated example, the value of "no security policy" is selected.

The "HDD remaining data deletion" 204 is an information security policy for designating whether or not to delete data remaining after completion of processing in a case where the non-volatile storage device is used as a temporary data storage area during e.g. copy processing or the like by the multifunction peripheral 101. In the illustrated example, the value of "delete" is selected.

Figures 19, 20:
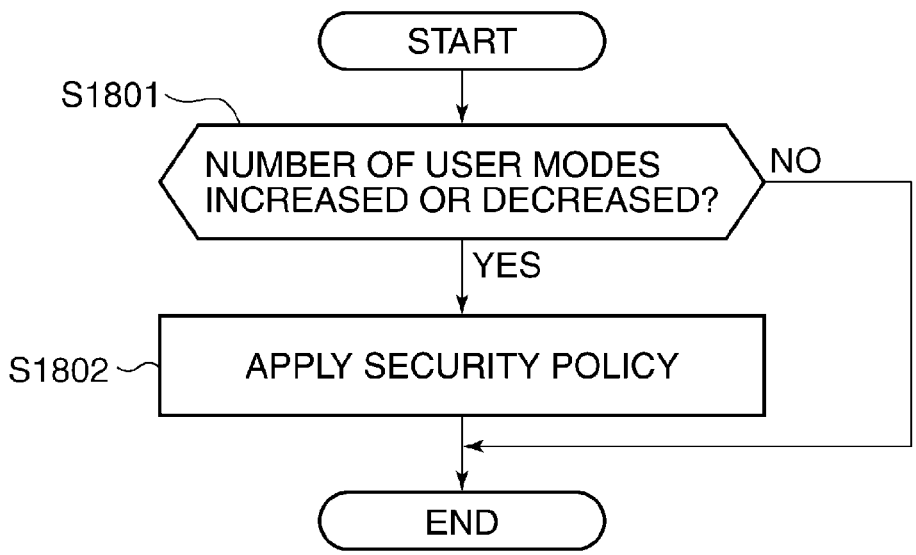
FIG. 19 A flowchart of a security policy determination process executed by a policy application determination section of the multifunction peripheral.
FIG. 20 A diagram showing an example of XML description of security policy data appearing in FIG. 4A.

The administrator configures each information security policy using the policy configuration screen 201. In the policy configuration screen 201, when the input section 123 receives depression of an "OK" button 205, the policy creation section 121 creates security policy data according to the details of settings configured on the policy configuration screen 201, and stores the created security policy data in the storage device 122. FIG. 4A shows an example of the security policy data stored in the storage device 122, represented in a table format. In the present embodiment, for simplicity of description, the security policy data in the table format is described, the data may be in an XML format or other data format. Note that FIG. 20 shows the security policy data shown in FIG. 4A, represented in the XML format.

In the security policy data, denoted by reference numeral 301 in FIG. 4A, a first column indicates a name (rule) 302 of each information security policy to be configured by the administrator from the policy configuration screen 201. A second column indicates a value (condition) 303 of the information security policy selected by the administrator from the policy configuration screen 201.

Next, a description will be given of the second stage in which the created security policy data is transmitted from the PC 125 to the multifunction peripheral 101 and is applied thereto, whereby it is determined whether or not the multifunction peripheral 101 is in the state compliant with the information security policies, and a result of the determination is notified to the administrator.

The input section 123 having received an instruction given by the administrator for transmitting security policy data instructs the policy transmission section 124 to execute transmission of the data. The policy transmission section 124 having received the instruction transmits the security policy data stored in the storage device 122 from the network communication section 118 to the network communication section 102 of the multifunction peripheral 101 over the network 126. Note that the PC 125 may be configured to automatically distribute the security policy data. Further, although it is desirable to employ a method of performing an authentication check on whether the security policy data has been transmitted by the administrator or a specific computer, description thereof is omitted in the present embodiment.

Figure 5:
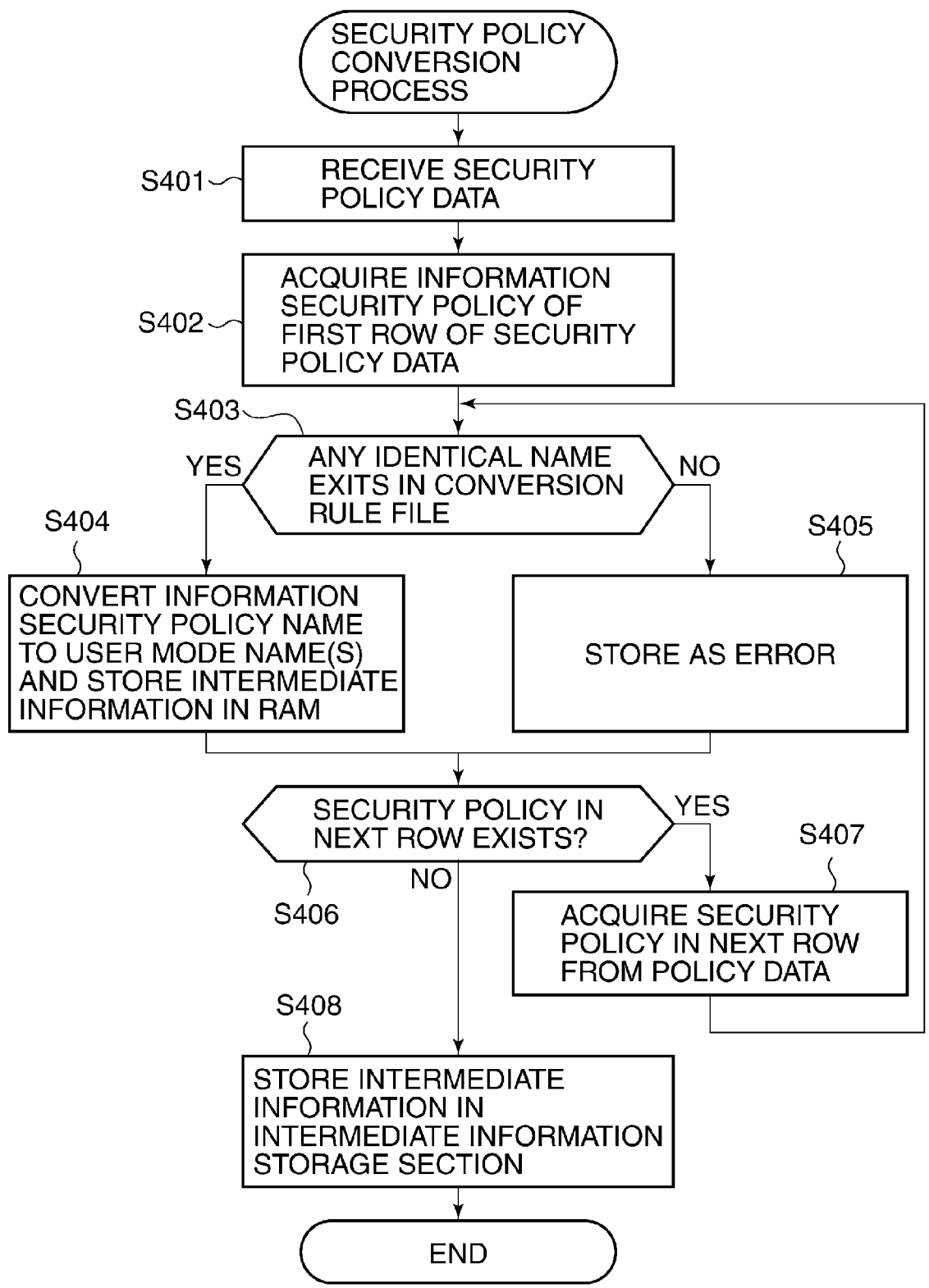
FIG. 5 A flowchart of a security policy conversion process executed by the multifunction peripheral.

FIG. 5 is a flowchart of a security policy conversion process executed when applying the security policy data to the multifunction peripheral 101. Note that, unless otherwise specified, this security policy conversion process is executed by the CPU 105 according to a program code read from the storage device 107 into the RAM 106.

In FIG. 5, in a step S401, when the network communication section 102 receives the security policy data from the PC 125, the policy reception section 117 stores the security policy data into the policy storage section 110.

Next, in a step S402, the policy conversion section 112 acquires the information security policy of a first row of the security policy data stored in the policy storage section 110, and then extracts a name of the information security policy and a value of the information security policy to store the name and value in the RAM 106.

Next, in a step S403, the policy conversion section 112 acquires a conversion rule file (FIG. 4B) stored in the conversion rule storage section 111. Then, the policy conversion section 112 compares the names of the information security policies written in a rule part 502 of the acquired conversion rule file with the name of the information security policy stored in the RAM 106. Then, it is determined whether or not the result of the comparison indicates that any of the names of the information security policies is identical to the name of the information security policy stored in the RAM 106. That is, it is determined whether or not the name of the information security policy extracted in the step S402 is included in a group of names of the information security policies of the conversion rule file shown in FIG. 4B. FIG. 4B shows an example of the conversion rule file stored in the conversion rule storage section 111, represented in a table format. Although in the present embodiment, a description is given of the conversion rule file in the table format, similarly to the security policy data, the conversion rule file need not be necessarily required to be in a table format.

In FIG. 4B, the conversion rule file, denoted by reference numeral 501, comprises the aforementioned rule part 502 and a condition part 503. A second column of the rule part 502 stores respective names of information security polices which can be written in the security policy data. A third column of the rule part 502 stores names of user modes associated with the names of the information security policies. A second column of the condition part 503 stores respective names of information security polices, and a third column of the condition part 503 stores respective values of information security policies which can be set to the security policy data. A final column of the condition part 503 stores conditions for determining that the settings of a user mode comply with each associated information security policy.

Although in the present embodiment, the conversion rule file 501 is described assuming that it is stored in the conversion rule storage section 111 in advance, similarly to the security policy data, the conversion rule file 501 may be received by the network communication section 102 from outside (e.g. from the PC 125). Further, the conversion rule file 501 may be distributed to the network communication section 102 by an administrator other than the administrator of an information system department who creates the security policy data, e.g. by an equipment administrator, and be stored in the conversion rule storage section 111.

In FIG. 4B, "file tampering detection" in the second column of the rule part 502 indicates that it is compatible with "PDF with forced digital signature" and "PDF with forced hash" of the user modes of the multifunction peripheral 101. This means that the multifunction peripheral 101 has a function of forcibly adding a hash value of a PDF file (digital signature obtained by encrypting the hash value, in the case of "PDF with forced digital signature") to the PDF file during creation thereof, and whether or not the multifunction peripheral 101 complies with the associated information security policy is determined based on values of these user modes.

Further, "file transmission and reception method" in the second column of the rule part 502 indicates that it is compatible with "FTP" and "SFTP" of the user modes of the multifunction peripheral 101. This means that the multifunction peripheral 101 has a function of selecting whether to use FTP or SFTP as a communication protocol, and whether or not the multifunction peripheral 101 complies with the associated information security policy of the "file transmission and reception method" is determined based on values of these user modes. Note that FIG. 21 shows the conversion rule file 501, represented in the XML format.

Referring again to FIG. 5, when it is determined in the step S403 that there is any identical name, the CPU 105 proceeds to a step S404. In the step S404, the policy conversion section 112 converts the name of the information security policy stored in the RAM 106 in the step S402 to respective associated names of the user modes written in the rule part 502 of the conversion rule file 501. Then, the policy conversion section 112 stores the converted names as intermediate information in the RAM 106 in association with the value of the information security policy selected by the administrator.

For example, "file tampering detection" in the security policy data 301 in FIG. 4A is identical to "file tampering detection" in the rule part 502 of the conversion rule file 501 in FIG. 4B.

Accordingly, the policy conversion section 112 converts "file tampering detection" which is the name of an information security policy to "PDF with forced digital signature" and "PDF with forced hash" which are the names of the user modes of the multifunction peripheral 101. Then, these names are associated with the value "any one enabled" of the information security policy, and stored as intermediate information in the RAM 106.

On the other hand, if it is determined in the step S403 that there is no identical name, the policy conversion section 112 regards the name of information security policy stored in the RAM 106 in the step S042 as error information, and stores the same as an error in the RAM 106 (step S405).

The case where the answer to the question of the step S403 is negative (NO) includes the following case: The name 302 acquired from the security policy data 301 is "HDD remaining data deletion" and the group of names of the information security policies written in the rule part 502 of the conversion rule file does not include the item of "HDD remaining data deletion".

Next, in a step S406, the policy conversion section 112 determines whether or not the security policy data has an information security policy in the following row. If it is determined that the security policy data has an information security policy in the following row, the CPU 105 proceeds to a step S407, wherein the policy conversion section 112 acquires the following row of the security policy data, and extracts the name and value of the information security policy to store the same in the RAM 106. Then the CPU 105 returns to the step S403. The steps S403 to S407 are repeatedly executed until all the information security polices contained in the security policy data are read. FIG. 4C shows an example of the intermediate information, represented in a table format, which is stored in the RAM 10 after all items of the security policy data shown in FIG. 4A have been read.

The intermediate information, denoted by reference numeral 601 in FIG. 4C, indicates that the "PDF with forced digital signature" and "PDF with forced hash" as user mode names are associated with "any one enabled" as an information security policy value. Further, "FTP" and "SFTP" as user mode names are associated with "no security policy" as an information security policy value. Note that "HDD remaining data deletion" in the security policy data 301 has no corresponding name in the conversion rule file 501, and hence, in the step S405, is regarded as error information and stored as an error in the RAM 106 (error information storage unit).

Referring again to FIG. 5, in a step S408, when the policy conversion section 112 has read all items of the security policy data, it stores the intermediate information stored in the RAM 106 into the intermediate information storage section 115.

Figure 6:
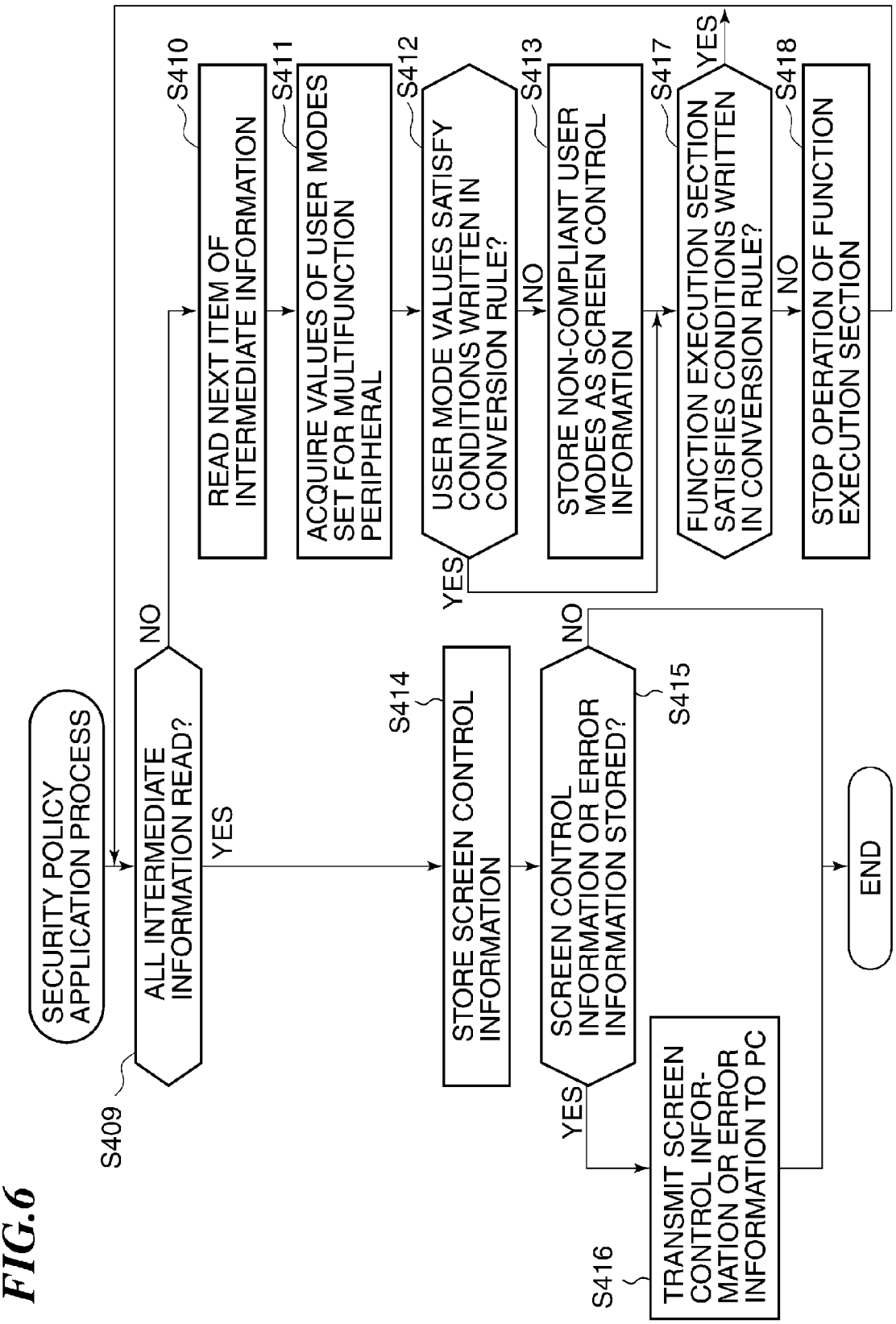
FIG. 6 A flowchart of a security policy application process executed by the multifunction peripheral.

FIG. 6 is a flowchart of a security policy application process executed by the multifunction peripheral 101 when security policy data is applied thereto. Note that, unless otherwise specified, this security policy application process is executed by the CPU 105 according to a program code read from the storage device 107 into the RAM 106.

In a step S409, the policy checking section 109 determines whether or not all items of the intermediate information stored in the intermediate information storage section 115 have been read. If it is determined that all items of the intermediate information have not been read, the CPU 105 proceeds to a step S410, wherein the policy checking section 109 acquires one of the values of the information security polices not acquired and user mode names associated therewith, from the intermediate information, and stores them in the RAM 106. In the case of the intermediate information 601 shown in FIG. 4C, the value of "any one enabled", and the user mode names of "PDF with forced digital signature" and "PDF with forced hash" are stored in the RAM 106.

Next, in a step S411, the policy checking section 109 acquires, using the names of the user modes stored in the RAM 106, the current values of the user modes set for the multifunction peripheral 101 from the user mode storage section 104. FIG. 7A shows the names and current values of the user modes stored in the user mode storage section 104 of the multifunction peripheral 101, represented in the table format. Note that "ON" in the table indicates that the function indicated by a user mode name has been enabled, and "OFF" in the same indicates that the function indicated by the user mode name has been disabled. For example, in the step S411, "OFF" and "OFF" are acquired as the respective values of "PDF with forced digital signature" and "PDF with forced hash", and are stored in the RAM 106.

In a step S412, the policy checking section 109 acquires, using a read value of the information security policy, conditions associated therewith, from the condition part 503 of the conversion rule file stored in the conversion rule storage section 111. Then, it is determined whether or not the current values of the user modes stored in the RAM 106 satisfy the conditions.

In the example of the condition part 503 shown in FIG. 4B, a condition associated with "use means highest in security level" as a value of "file tampering detection" indicates that if the current value of "PDF with forced digital signature" of the user mode is "ON", it is to be determined in the step S412 that the condition is satisfied. A condition associated with "any one enabled" as a value of the same indicates that if the current value of either "PDF with forced digital signature" or "PDF with forced hash" of the user mode is "ON", it is to be determined in the step S412 that the condition is satisfied. A condition associated with "no security policy" as a value of the same indicates that irrespective of the current values of the user modes", it is to be determined in the step S412 that the condition is satisfied. A condition associated with "OK for encrypted communication" as a value of "file transmission and reception method" indicates that if the current values of "FTP" and "SFTP" of the user modes are "OFF" and "ON", respectively, it is to be determined that the condition is satisfied.

If it is determined in the step S412 that the condition is satisfied, the CPU 105 proceeds to a step S417, whereas if not, a combination of the information stored in the RAM 106 in the step S410 and the condition acquired from the conversion rule in the step S412 are temporarily stored as screen control information into the RAM 106 (step S413), whereafter the CPU 105 proceeds to the step S417.

In the step S417, the policy checking section 109 checks not only the values of the user modes but also whether the applications being executed or to be executed by the function execution section 150 of the multifunction peripheral 101 comply with the security policies. If it is determined in the step S417 that the applications comply with security policies (YES to the step S417), the CPU 105 returns to the step S409, whereas if it is determined in the step S417 that any application does not comply with security policies (NO to the step S417), the CPU 105 proceeds to a step S418, wherein the policy checking section 109 causes the operation of the application being executed or to be executed by the function execution section 150 but not compliant with the security polices to be stopped.

The steps S417 and S418 will be described in detail hereafter.

First, the policy checking section 109 determines whether each application (executed by the function execution section 150) installed on the multifunction peripheral 101 is concerned with the security policies. For example, in a case where the security policy of "file tampering detection" is applied to the multifunction peripheral 101, it is determined whether or not an application (to be executed by the function execution section 150) installed on the multifunction peripheral 101 is an application that handles a file, i.e. an application concerned with "file tampering detection". If the application is an application concerned with "file tampering detection", the policy checking section 109 determines whether the application is capable of complying with the security policy of "file tampering detection".

If the application is capable of complying with the security policy of "file tampering detection", a file tampering detecting function of the application may be forcibly enabled or the application may be notified of an absolute requirement to execute file tampering detection.

On the other hand, if it is determined in the step S412 that the application is incapable of complying with the security policy of "file tampering detection", the policy checking section 109 stops the application not complying with the security policies. To stop the operation of the application implies "to inhibit starting of the application".

Note that when there are a plurality of applications (to be executed by the function execution section 150) installed on the multifunction peripheral 101, an application not complying with the security policies is identified from the plurality of applications, and the operation of the identified application is stopped.

The steps S409 to S413 are executed until all items of the intermediate information are read. Upon reading all the items of the intermediate information, the CPU 105 proceeds to a step S414.

In the step S414, the policy checking section 109 stores the screen control information stored in the RAM 106 into the screen control information storage section 116. FIG. 7B shows an example of the screen control information, represented in the table format, which has been stored in the RAM 106 when executing the step S414.

In the example illustrated in FIG. 7A, referred to when describing the step S411, both of the current values of "PDF with forced digital signature" and "PDF with forced hash" are OFF, and hence the condition for "any one enabled" is not satisfied, and hence the screen control information shown in FIG. 7B is stored. On the other hand, the values of "FTP" and "SFTP" are "no security policy", and hence the screen control information therefor is not stored.

In a step S415 in FIG. 6, it is determined whether or not there is the name of an information security policy stored as an error in the RAM 106 in the step S405 in FIG. 5 or the screen control information stored in the screen control information storage section 116 in the step S414.

If it is determined that there is the name of an information security policy or the screen control information, the CPU 105 proceeds to a step S416, wherein the policy checking section 109 sends the stored information from the network communication section 102 to the PC 125 over the network 126.

Upon receipt of the name of the information security policy at the network communication section 118, the PC 125 notifies the administrator that there is an information security policy which cannot be applied to the multifunction peripheral 101. Further, in a case where the PC 125 has received the screen control information from the multifunction peripheral 101, it displays a display screen as shown in FIG. 8A to thereby notify the administrator that the multifunction peripheral 101 is in a state violating the information security policy.

As shown in FIG. 8A, the display screen displays "HDD remaining data deletion" stored as an error in the RAM 106 in the step S405 under the heading of "<ERROR!>", and "PDF with forced digital signature" and "PDF with forced hash" extracted from the screen control information under the heading of "CAUTION!". Note that although in the present embodiment, as the method of notification to the administrator, there is employed the method of displaying the screen by the PC 125, this is not limitative, but there may be employed a method other than this, such as the method of transmitting information by E-mail.

From the above, according to the present embodiment, the security policy data created by the PC 125 can be appropriately applied to the multifunction peripheral 101. Especially, the administrator of the information system department who creates information security policy using the PC 125 can create the information security policy without being conscious of the functions, settings of the user modes, and the like of the multifunction peripheral 101.

Next, a description will be given the third stage in which the user uses the multifunction peripheral 101 having the security policy data applied thereto, in a state compliant with information security policy.

Figure 9:
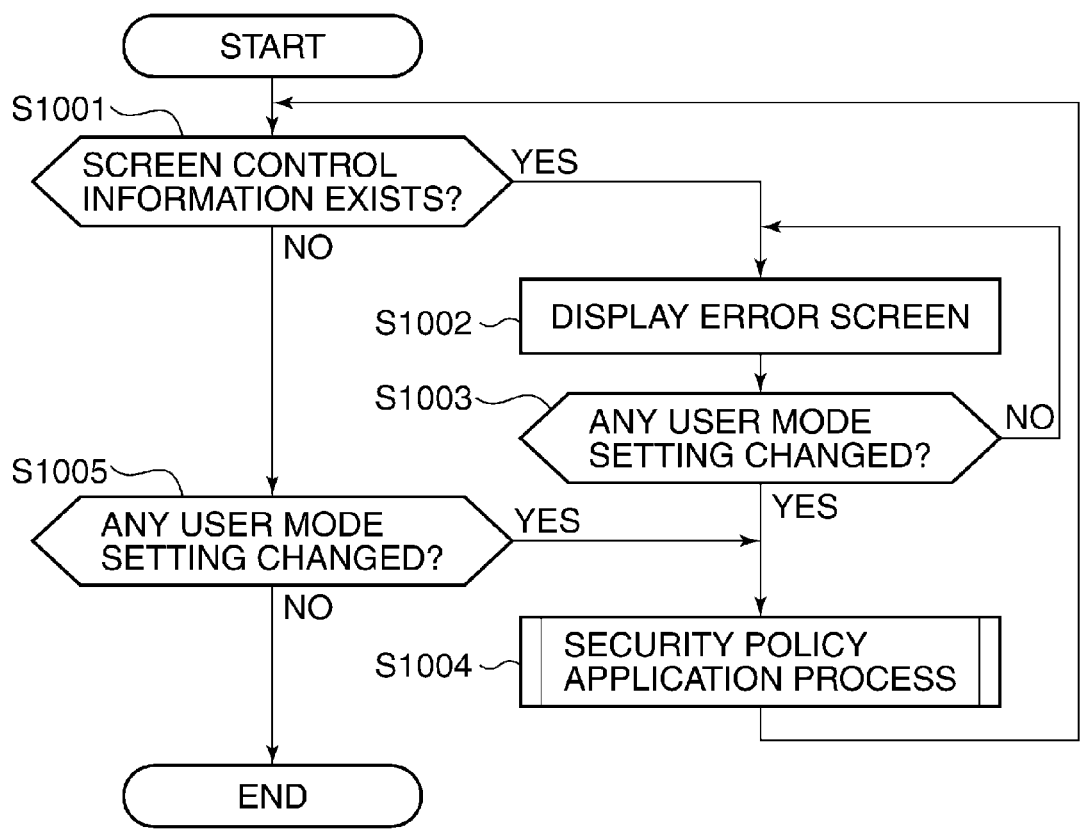
FIG. 9 A flowchart of a process executed by the screen control section of the multifunction peripheral.

FIG. 9 is a flowchart of a process executed by the screen control section 113 of the multifunction peripheral 101. Note that, unless otherwise specified, this process is executed by the screen control section 113 implemented by the CPU 105 according to a program code read from the storage device 107 into the RAM 106. The process shown in FIG. 9 is executed after the security policy application process shown in FIG. 6 is executed.

In a step S1001, it is determined whether or not there is screen control information stored in the screen control information storage section 116. If it is determined that there is screen control information, in a step S1002, the screen control section 113 displays an error screen. FIG. 8B shows an example of the error screen displayed by the screen control section 113. In the present embodiment, the screen control section 113 extracts from the screen control information shown in FIG. 7B the names of user modes, and displays a message saying to the effect that it is required to change the settings of "PDF with forced digital signature" and "PDF with forced hash". However, similarly to the FIG. 8A screen, the FIG. 8B screen may display, under the heading of "<ERROR!>", a message saying to the effect that the security policy of "HDD remaining data deletion" has not been applied. Then, there may be displayed a message saying to the effect that a function necessary for complying with the security policy of "HDD remaining data deletion" is to be added to the multifunction peripheral 101.

Further, in the present embodiment, in a state where the error screen is displayed, the function of the multifunction peripheral 101, which the user is permitted to make use of, is only configuration of the user modes by using the user interface operation section 103. Note that screen control may be performed such that the user is permitted to make use of functions which are not related to the user modes violating the information security policy.

Referring again to FIG. 9, in a step S1003, the screen control section 113 determines whether or not a user's operation on the user interface operation section 103 has changed any value of the user modes stored in the user mode storage section 104. If it is determined that no values of the user modes have been changed, the screen control section 113 returns to the step S1002 to thereby continue to display the error screen shown in FIG. 8B. On the other hand, if any value of the user modes has been changed, the screen control section 113 proceeds to a step S1004, wherein the CPU 105 applies the security policy data to the multifunction peripheral 101 using the intermediate information stored in the intermediate information storage section 115, and then returns to the step S1001. Note that processing executed in the step S1004 is identical to processing executed in the steps S409 to S416 in FIG. 6, and hence description thereof is omitted.

If it is determined in the step S1001 that there is no screen control information, the screen control section 113 performs the same determination as executed in the step S1003 (step S1005). If it is determined in the step S1005 that any value of the user modes has been changed, the screen control section 113 proceeds to the step S1004, whereas if it is determined in the step S1005 that no value of the user modes has been changed, the screen control section 113 terminates the present process, and then starts the process shown in FIG. 9 again.

In the present embodiment, the description has been given of a case where the administrator creates security policy data using the policy creation section 121 of the PC 125. However, the policy creation section 121 may be provided within the multifunction peripheral 101, whereby the administrator may access the multifunction peripheral 101 using the user interface operation section 103 or the PC 125, and configure the settings of the security polity data.

According to the first embodiment, the security policy data is converted to conditions which the settings of the user modes of the multifunction peripheral should satisfy, and it is determined whether or not the present settings of the user modes of the multifunction peripheral satisfy the conditions obtained by the conversion. Then, if it is determined that the settings of the user modes of the multifunction peripheral do no satisfy the conditions, the use of the multifunction peripheral by the user is restricted and the user is notified that the settings of the user modes should be reconsidered. This makes it possible to advise the user to change the settings of the user modes such that the user modes are made compliant with the information security policy, to thereby maintain the multifunction peripheral in a state compliant with the information security policy.

Next, a description will be given of a second embodiment of the present invention. In the second embodiment, there is described a method of preventing a user from changing the multifunction peripheral 101 from a state compliant with information security policy to a state violating the information security policy. The second embodiment is similar to the first embodiment except processing executed when the user opens a user mode configuration screen by using the user interface operation section 103. Therefore, the same elements as those of the first embodiment are denoted by the same reference numerals, and description thereof is omitted. Different points of the second embodiment from the first embodiment will be described hereafter.

In the present embodiment, the description starts to be given by referring to the multifunction peripheral 101 in the state where the same security policy data as in the first embodiment is applied thereto.

Figure 10:
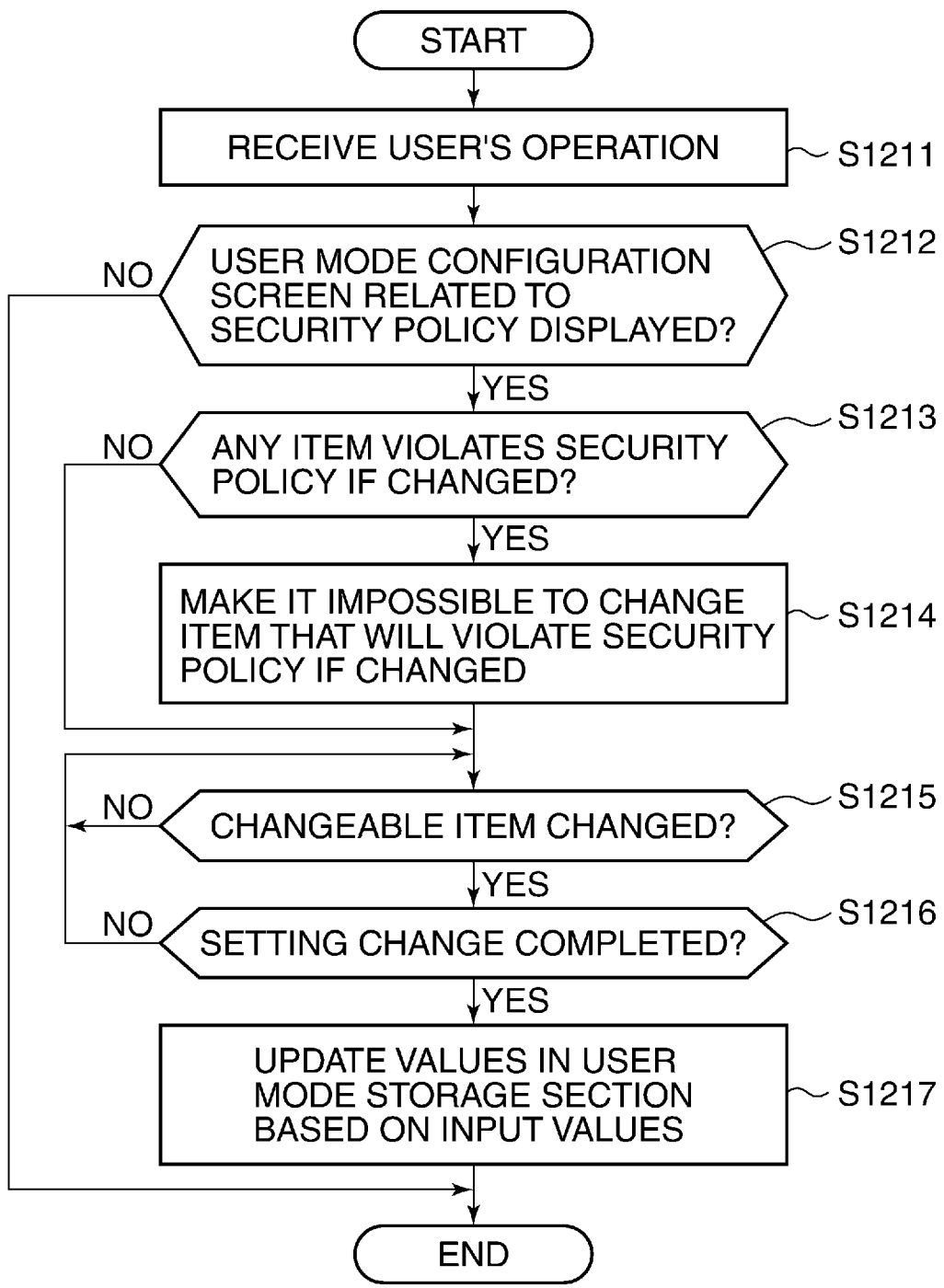
FIG. 10 A flowchart of an information security policy violation prevention process executed by a multifunction peripheral as an image processing apparatus according to a second embodiment of the present invention at the time of configuration of settings of user modes.

FIG. 10 is a flowchart of an information security policy violation prevention process executed at the time of configuration of settings of user modes. Note that, unless otherwise specified, this process is executed by the screen control section 113 implemented by the CPU 105 according to a program code read from the storage device 107 into the RAM 106.

In a step S1211, the screen control section 113 receives a user's operation on the user interface operation section 103 and displays a user mode configuration screen.

Next, in a step S1212, the screen control section 113 acquires names of the user modes from the intermediate information storage section 115, and determines whether or not the displayed user mode configuration screen is a screen for configuring settings of a user mode related to an information security policy. If it is determined that the displayed user mode configuration screen is not a screen for configuring settings of a user mode related to an information security policy, the present process is immediately terminated. On the other hand, if it is determined that the displayed user mode configuration screen is a screen for configuring settings of a user mode related to an information security policy, the screen control section 113 proceeds to a step S1213.

Figure 11A:
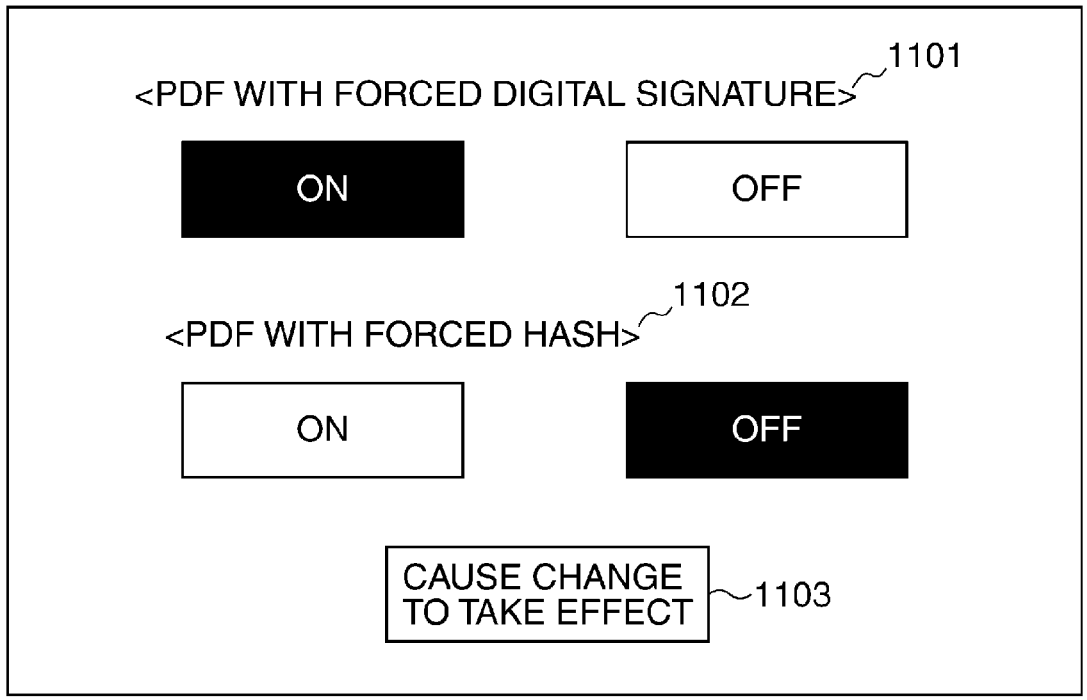
FIG. 11A A diagram showing an example of a user mode configuration screen displayed on a user interface operation section of the multifunction peripheral.

In the step S1213, the screen control section 113 determines whether or not there is any item that comes to violate any of the information security policies if the present setting thereof is changed on the user mode configuration screen. FIG. 11A shows an example of the user mode configuration screen displayed on the user interface operation section 103. In the illustrated example, "PDF with forced digital signature" 1101 is set to "ON" while "PDF with forced hash" 1102 is set to "OFF". Note that a "Cause Change to Take Effect" button 1103 is for causing a selection made on the screen to be reflected on the values of user modes stored in the user mode storage section 104 of the multifunction peripheral 101.

In the case of FIG. 11A, to determine whether or not there is any item a change of which comes to violate any of the information security policies, first, assuming that "PDF with forced digital signature" 1101 is changed to "OFF", processing in the steps S409 to S413 in FIG. 6 is executed. In the multifunction peripheral 101, the information security policy of "file tampering detection" is violated unless at least one of "PDF with forced digital signature" and "PDF with forced hash" is ON. Therefore, it is determined that the change of "PDF with forced digital signature" 1101 to "OFF" causes violation of the associated information security policy. By executing a similar process, it is determined that a change of "PDF with forced hash" 1102 to "ON" does not cause violation of the associated information security policy.

In a step S1214, the screen control section 113 performs screen control such that it is impossible to change the setting of an item which comes to violate any of the information security policies if the setting thereof is changed. In the illustrated example, the screen shown in FIG. 11A is changed to a screen shown in FIG. 11B. In the example illustrated in FIG.

11B, an "OFF" button 1104 for "PDF with forced digital signature" 1101 is changed (grayed out) such that the setting thereof cannot be changed. That is, the setting of "PDF with forced hash" 1102 can be changed to "ON" but the setting of "PDF with forced digital signature" 1101 cannot be changed to "OFF".

Figure 11B:
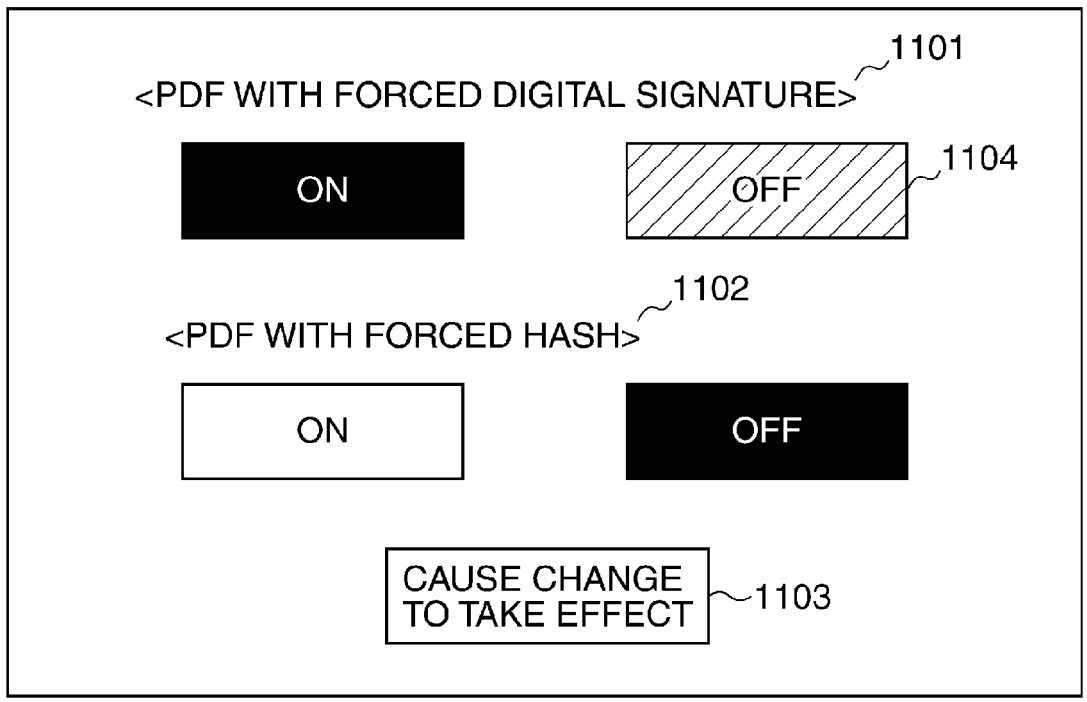
FIG. 11B A diagram showing an example of a user mode configuration screen in which items are displayed such that changes to settings which violate the information security policy are not permitted.
Figure 12A:
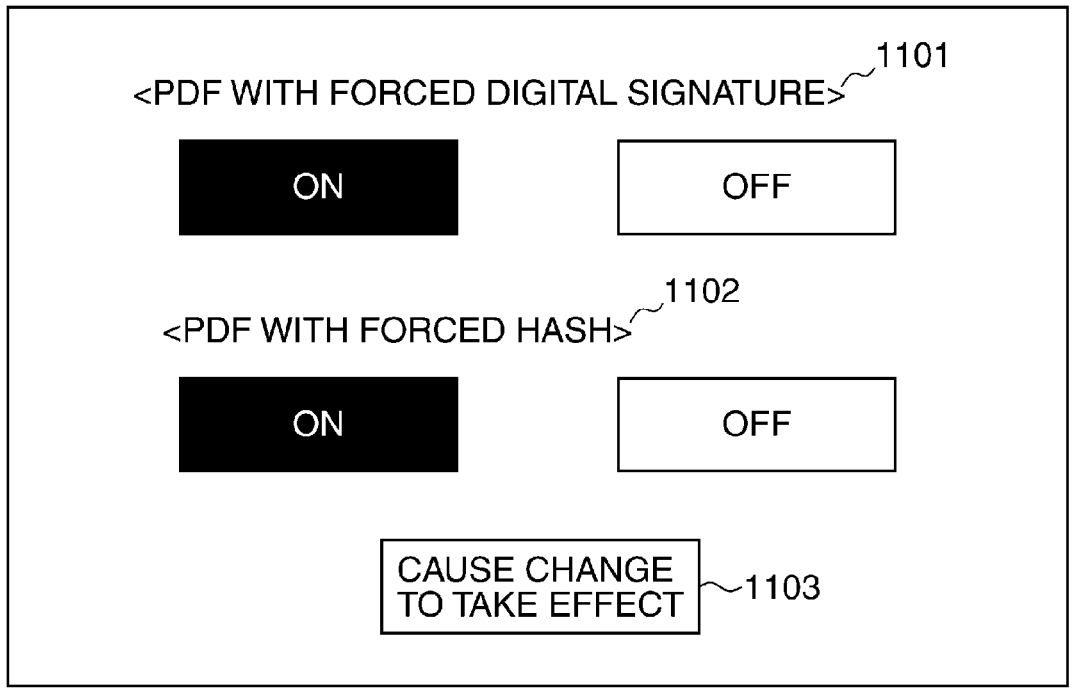
FIG. 12A A diagram showing a screen in which "PDF with forced hash" on the FIG. 11B screen is set to "ON".

In a step S1215, the screen control section 113 determines whether or not any setting-changeable item has been changed. If any setting-changeable item has been changed, the screen control section 113 proceeds to a step S1216. For example, FIG. 12A shows a screen in which the setting of "PDF with forced hash" 1102 on the screen shown in FIG. 11B is changed to "ON".

In the step S1216, the screen control section 113 determines whether or not the user has made an input of setting configuration completion to the user interface operation screen 103. If the input has not been made, the screen control section 113 returns to the step S1215, whereas if the input has been made, the screen control section 113 proceeds to a step S1217. In the step S1217, the screen control section 113 updates the values stored in the user mode storage section 104 based on the values input from the user interface operation section 103, followed by terminating the present process.

According to the present embodiment, the user is prevented from making an input which will cause a setting to violate any of the information security policies, and hence it is possible to prevent a wrong user mode setting configuration from placing the multifunction peripheral in a state violating any of the information security policies.

Next, a description will be given of a third embodiment of the present invention. In an office where multifunction peripherals having the function for changing security policy-related settings, described in the first embodiment, and multifunction peripherals without the function for changing security policy-related settings are mixedly installed, the security policy-related settings of each of the latter multifunction peripherals are required to be manually configured such that they are made compliant with the information security policies. In view of this, in the third embodiment, there is described a method of configuring the security policy-related settings of even a multifunction peripheral without the function for changing security policy-related settings described in the first embodiment, such that they are made compliant with the same information security policies as applied to the multifunction peripherals having the function for changing security policy-related settings. Note that the elements as those of the first embodiment are denoted by the same reference numerals, and description thereof is omitted. Different points of the third embodiment from the first embodiment will be described hereafter.

Figure 13:
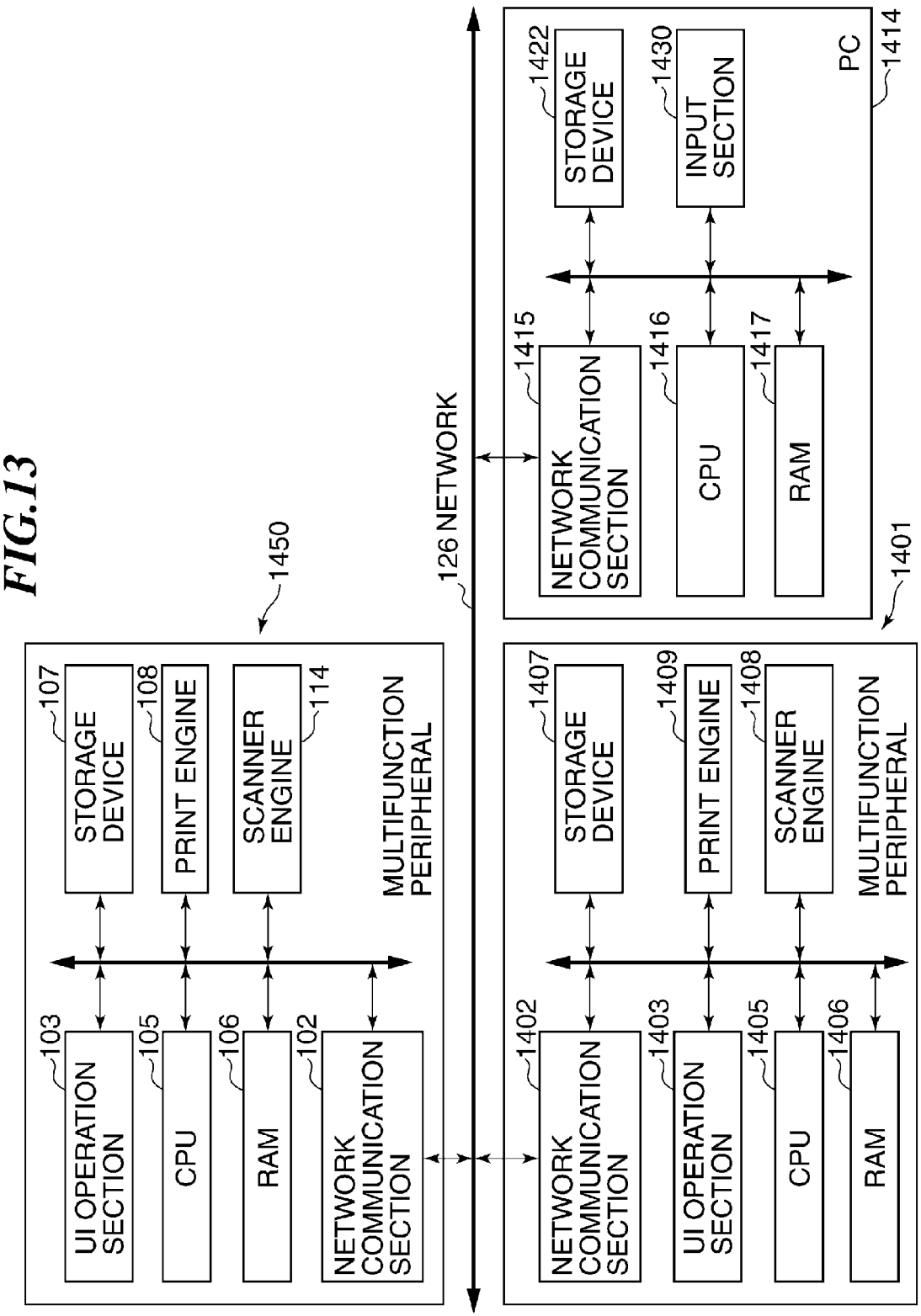
FIG. 13 A schematic block diagram showing the hardware configuration of each of apparatuses forming an information processing system including an image processing apparatus according to a third embodiment of the present invention.

FIG. 13 is a schematic block diagram showing the hardware configuration of each of apparatuses forming an information processing system including an image processing apparatus according to the third embodiment of the present invention.

In FIG. 13, reference numeral 1401 denotes the multifunction peripheral without the function for changing security policy-related settings described in the first embodiment. Reference numeral 1450 denotes a multifunction peripheral having the function for changing security policy-related settings described in the first embodiment. Reference numeral 1414 denotes a PC with which the administrator performs creation and distribution of security policy data, and configuration and distribution of settings of user modes complying with the information security policies.

The multifunction peripheral 1450 includes, similarly to the multifunction peripheral 101, the network communication section 102, the user interface operation section 103, the CPU 105, the RAM 106, the storage device 107, the print engine 108, and the scanner engine 114. The multifunction peripheral 1401 includes a network communication section 1402, a user interface operation section 1403, a CPU 1405, a RAM 1406, a storage device 1407, a print engine 1409, and a scanner engine 1408. Although the components of the multifunction peripheral 1401 are denoted by respective reference numerals different from those of the multifunction peripheral 101, for convenience sake, the hardware configuration is substantially the same between the two multifunction peripherals.

The PC 1414 includes a network communication section 1415, a CPU 1416, a RAM 1417, a storage device 1422, and an input section 1430. Although the components of the PC 1414 are denoted by respective reference numerals different from those of the PC 125, for convenience sake, the hardware configuration is substantially the same between the two PCs.

Figure 14:
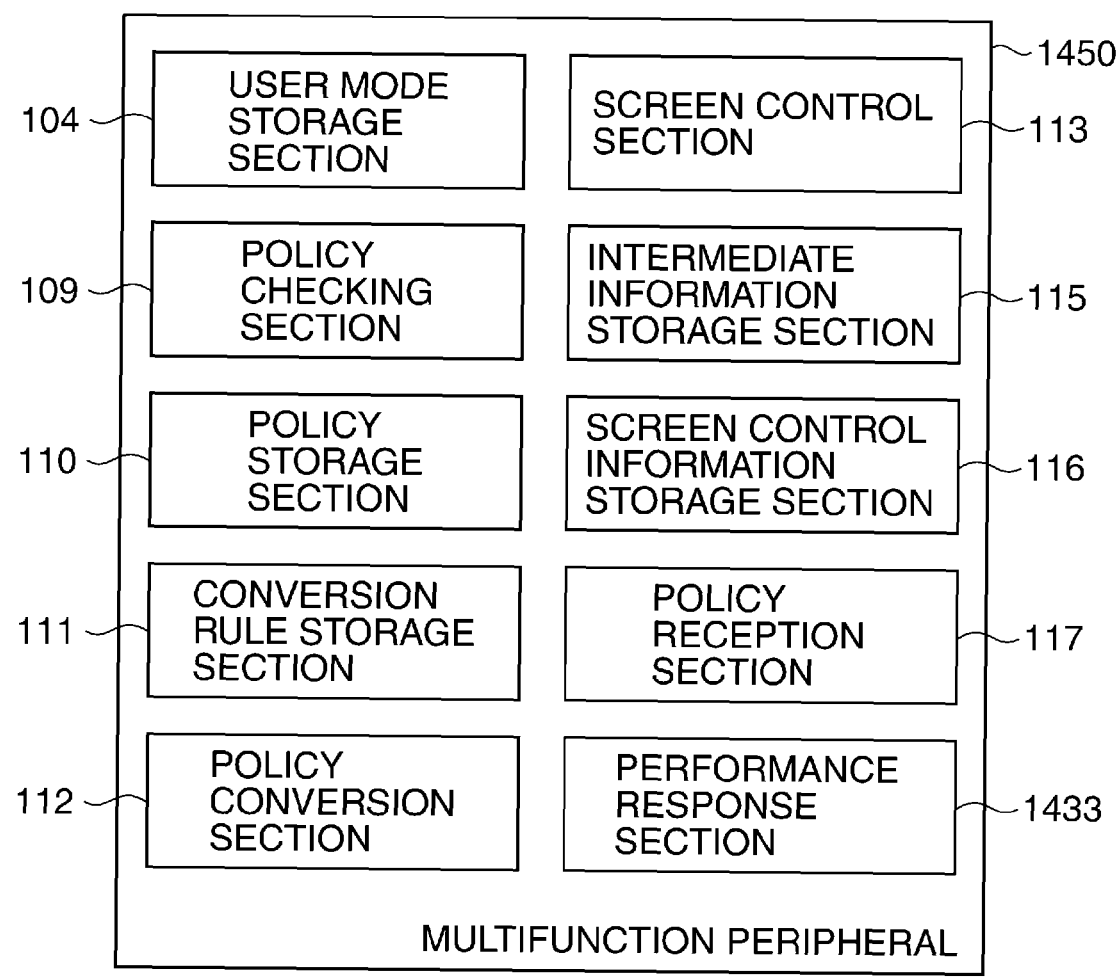
FIG. 14 A schematic block diagram showing a configuration of functions of the multifunction peripheral as the image processing apparatus according to the third embodiment appearing in FIG. 13, which are related to control of information security policy.

FIG. 14 is a schematic block diagram showing a configuration of functions of the multifunction peripheral 1450, which are related to control of information security policy.

The multifunction peripheral 1450 is formed by adding a performance response section 1433 to the multifunction peripheral 101 shown in FIG. 2A. When the network communication section 102 receives a request for confirming whether the multifunction peripheral 1450 has a function for receiving security policy data, the performance response section 1433 responds thereto.

Figure 15A:
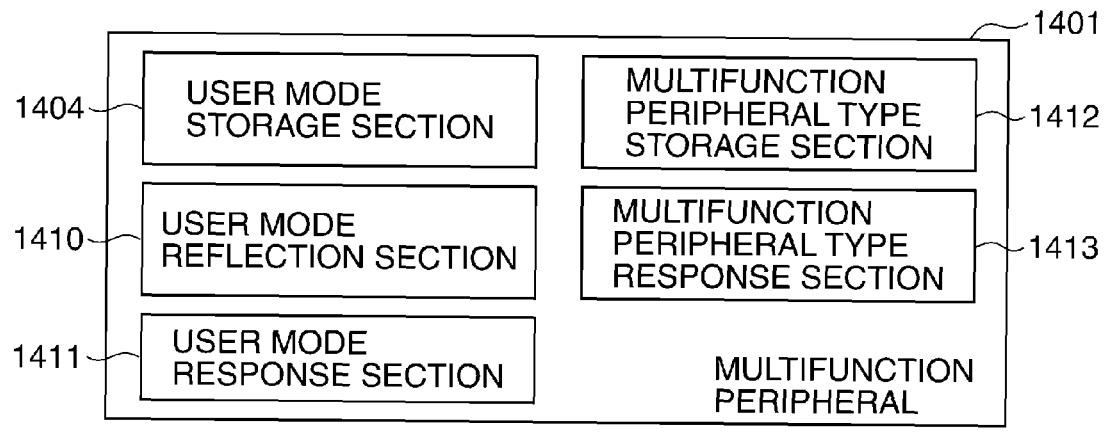
FIG. 15A A schematic block diagram showing a configuration of functions of another multifunction peripheral appearing in FIG. 13, which are related to control of the information security policy.
Figure 15B:
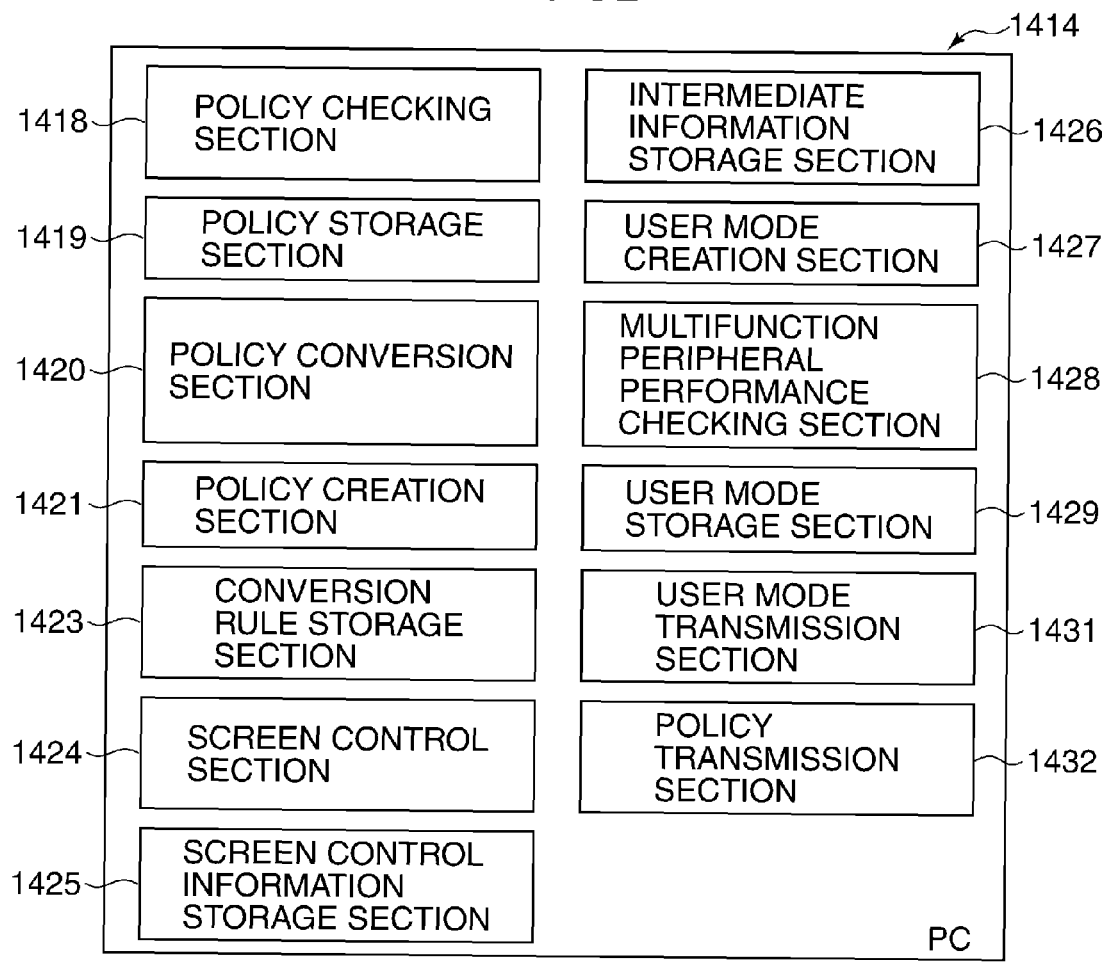
FIG. 15B A schematic block diagram showing a configuration of functions of a PC appearing in FIG. 13, which are related to control of the information security policy.

FIG. 15A is a schematic block diagram showing a configuration of functions of the multifunction peripheral 1401, which are related to control of the information security policy, and FIG. 15B is a schematic block diagram showing a configuration of functions of the PC 1414, which are related to control of the information security policy.

In FIG. 15A, reference numeral 1410 denotes a user mode reflection section that reads a user mode file distributed over the network 126 and updates values of user modes stored in a user mode storage section 1404. Reference numeral 1411 denotes a user mode response section that acquires, when the network communication section 1402 receives a request for acquiring settings of user modes via the network 126, names and values of the user modes stored in the user mode storage section 1404, and returns the names and values as a response to the requester. Reference numeral 1412 denotes a multifunction peripheral type storage section that stores a multifunction peripheral type file in which information indicating a type of the multifunction peripheral is written. Reference numeral 1413 denotes a multifunction peripheral type response section that returns, when the network communication section 1402 receives a request for acquiring a multifunction peripheral type via the network 126, the multifunction peripheral type file stored in the multifunction peripheral type storage section 1412 as a response to the requester.

Reference numeral 1423 in FIG. 15B showing the functions of the PC 1414, which are related to control of the information security policy, denotes a conversion rule storage section which is equivalent to the conversion rule storage section 111 of the multifunction peripheral 101 in the first embodiment, except that not the conversion rule of a particular multifunction peripheral but the conversion rules of all multifunction peripherals connected to the network 126 are stored in association with respective multifunction peripheral types.

Reference numeral 1427 denotes a user mode creation section that creates values of user modes complying with the information security policies. Reference numeral 1428 denotes a multifunction peripheral performance checking section that communicates with an external apparatus from the network communication section 1415 via the network 126 and confirms whether or not the external apparatus has a function for receiving the security policy data.

Reference numeral 1429 denotes a user mode storage section that stores values created by the user mode creation section and names of the user modes associated therewith. Reference numeral 1431 denotes a user mode transmission section that transmits names and values of the user modes stored in the user mode storage section 1429.

Note that the policy checking section 1418, a policy storage section 1419, a policy conversion section 1420, a policy creation section 1421, a screen control section 1424, a screen control information storage section 1425, an intermediate information storage section 1426, and a policy transmission section 1432 are approximately the same as those having the same names and described with reference to FIG. 2A, and description thereof is omitted. Further, the creation of the security policy data by the administrator in the present embodiment is the same as executed in the first embodiment, and hence description thereof is omitted.

Next, a description will be given of the operations of component devices of the present embodiment performed when information security policies are distributed.

First, the multifunction peripheral performance checking section 1428 of the PC 1414 queries a multifunction peripheral on the network to which security policy data is to be distributed as to whether or not the multifunction peripheral is capable of receiving security policy data. For example, when the multifunction peripheral 1450 is queried, the performance response section 1433 thereof returns from the network communication section 102 over the network 126 to the network communication section 1415 of the PC 1414 a response that it is capable of receiving security policy data. When the network communication section 1415 receives the response, the multifunction peripheral performance checking section 1428 determines that the multifunction peripheral 1450 is capable of receiving the security policy data.

On the other hand, in a case where the multifunction peripheral 1401 is queried, since the multifunction peripheral 1401 has no performance response section, no response is returned to the network communication section 1415. Therefore, the multifunction peripheral performance checking section 1428 determines that the multifunction peripheral 1401 is not capable of receiving the security policy data.

When it is determined that the multifunction peripheral 1450 is capable of receiving the security policy data, the PC 1414 transmits the security policy data thereto. The multifunction peripheral 1450 applies the received security policy data to itself. This application processing is the same as the processing described hereinabove in the first embodiment with reference to FIGS. 5 and 6, and hence description thereof is omitted.

When it is determined that the multifunction peripheral 1401 is incapable of receiving the security policy data, the user mode creation section 1427 of the PC 1414 sends a request for the current values of the user modes to the multifunction peripheral 1401 from the network communication section 1415 over the network 126.

When the network communication section 1402 of the multifunction peripheral 1401 receives the request for the current values of the user modes, the user mode response section 1411 acquires the names and values of the user modes stored in the user mode storage section 1404. The user mode response section 1411 transmits the acquired names and values of the user modes from the network communication section 1402 over the network 126 to the network communication section 1415 of the PC 1414.

When the network communication section 1415 receives the names and values of the user modes, the user mode creation section 1427 of the PC 1414 stores the received names and values of the user modes in the RAM 1417. The following description will be given assuming that the names and values of the user modes stored in the user mode storage section 1404 are, as shown in FIG. 7A, "PDF with forced digital signature" and "PDF with forced hash" with respective values of "OFF" and "FTP" and "SFTP" with respective values of "ON".

The user mode creation section 1427 of the PC 1414 sends a request for the multifunction peripheral type to the network communication section 1402 of the multifunction peripheral 1401, from the network communication section 1415 over the network 126.

When the network communication section 1402 of the multifunction peripheral 1401 receives the request for the multifunction peripheral type, the multifunction peripheral type response section 1413 of the same returns the multifunction peripheral type file stored in the multifunction peripheral type storage section 1412 to the network communication section 1415 of the PC 1414 from the network communication section 1402 over the network 126.

When the network communication section 1415 receives the multifunction peripheral type file, the user mode creation section 1427 of the PC 1414 acquires the type of the multifunction peripheral from the multifunction peripheral type file and stores the same in the RAM 1417. In the present embodiment, the description will be given assuming that information indicating a multifunction peripheral type written in the multifunction peripheral type file stored in the multifunction peripheral type storage section 1412 is "aaa". Therefore, "aaa" is stored in the RAM 1417.

FIG. 16 is a diagram showing an example of combinations of multifunction peripheral types and conversion rule files stored in the conversion rule storage section 1423 of the PC 1414 each in the form of a table. Note that they are not necessarily required to be in the form of a table as in the illustrated example, but may be in an XML format. In the illustrated example, a conversion rule file of a multifunction peripheral of which the type is "aaa" and a conversion rule file of a multifunction peripheral of which the type is "bbb" are stored in the conversion rule storage section 1423.

The user mode creation section 1427 of the PC 1414 acquires a conversion rule file associated with the multifunction peripheral type stored in the RAM 1417 from the conversion rule storage section 1423, and stores the same in the RAM 1417. Next, the PC 1414 executes application of the security policy data to the settings of user modes. Note that the processing thereof is equivalent to the processing from the step S402 in FIG. 5 to the step S416 in FIG. 6 except that the processing is executed by the PC 1414 and the conversion rule and the present settings of the user modes are stored in the RAM 1417 of the PC 1414, and hence description thereof is omitted.

In the present embodiment, after application of the security policy data, the screen control information shown in FIG. 7B is stored in the screen control information storage section 1425 of the PC 1414.

Next, a process executed by the user mode creation section 1427 of the PC 1414 after applying the security policy data to the multifunction peripheral 1401 will be described with reference to FIG. 17.

Figure 17:
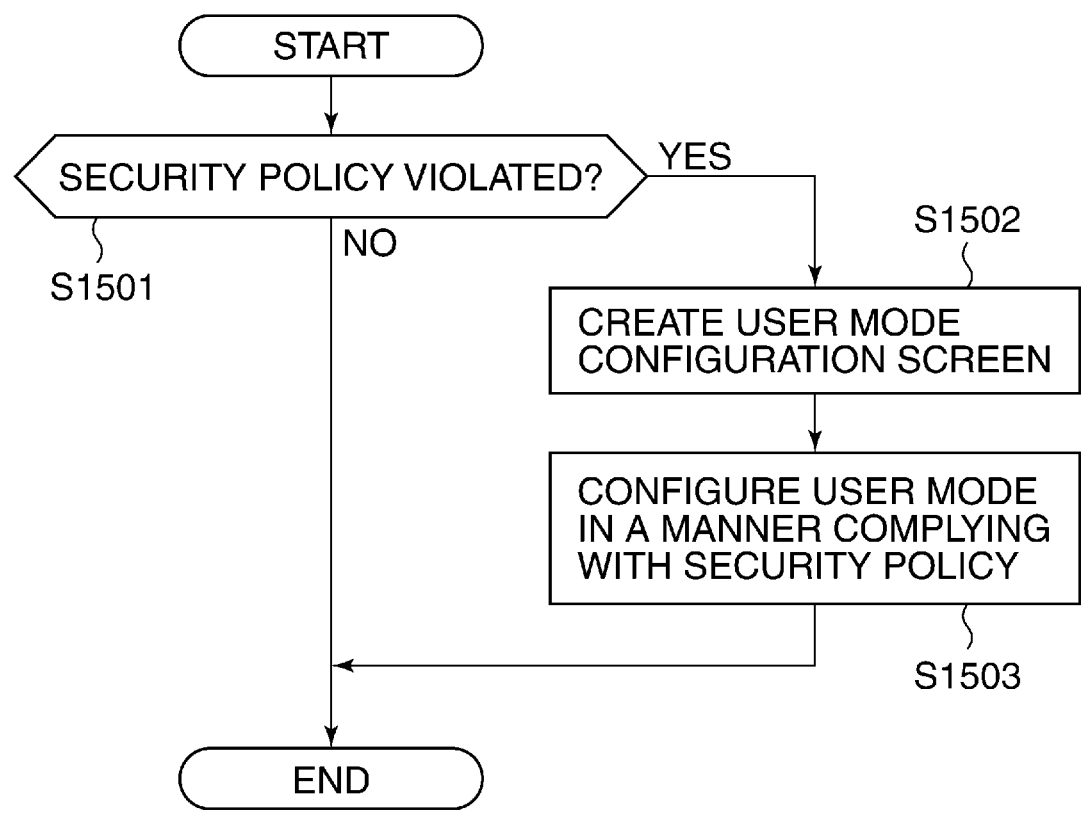
FIG. 17 A flowchart of a process executed by a user mode creation section of the PC.

FIG. 17 is a flowchart of the process executed by the user mode creation section 1427. Note that unless otherwise specified, this process is executed by the user mode creation section 1427 implemented by the CPU 1416 according to a program code read from the storage device 1422 of the PC 1414 into the RAM 1417 of the same.

Figure 12B:
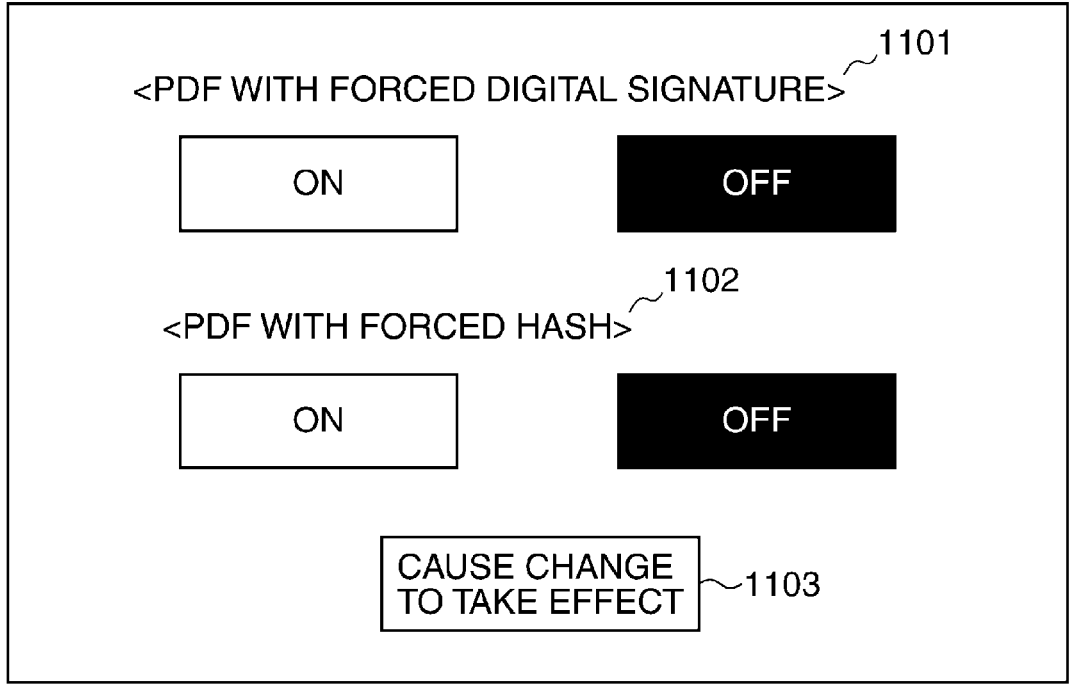
FIG. 12B A diagram showing an example of a created user mode configuration screen.

In a step S1501, the user mode creation section 1427 determines whether or not the multifunction peripheral 1401 is compliant with the information security policies by determining whether or not the screen control information is stored in the screen control information storage section 1425. If it is determined that the screen control information is not stored, the user mode creation section 1427 determines that the multifunction peripheral 1401 is compliant with the security policies, followed by terminating the present process. On the other hand, if it is determined the screen control information is stored, it means that the multifunction peripheral 1401 is not compliant with any of the information security policies, and hence it is necessary to change the settings of user modes. Accordingly, the user mode creation section 1427 proceeds to a step S1502, wherein it acquires the screen control information from the screen control information storage section 1425. Then, the user mode creation section 1427 extract the names of the user modes from the screen control information, and acquires the values of user modes by using the names acquired from the RAM 1417, and stores the values in the user mode storage section 1429. Further, the user mode creation section 1427 creates a user mode configuration screen based on the names and values of the user modes stored in the user mode storage section 1429 (step S1502). FIG. 12B shows an example of the user mode configuration screen thus created.

In the following step S1503, the user mode creation section 1427 displays the user mode configuration screen created in the step S1502 on the input section 1430.

Further, the user mode creation section 1427 prompts the administrator to change the settings of the user modes such that they are made compliant with the information security policies, and stores the values of the user modes complying with the information security policies in the user mode storage section 1429. This processing is approximately the same as that executed in the steps S1001 to S1005 in FIG. 9, except that input operations of the administrator and display are performed not on the user interface operation section of the multifunction peripheral but on the input section 1430 of the PC 1414, and hence description thereof is omitted. When the administrator performed the input operations as shown in FIG. 11A, settings of "ON" of "PDF with forced digital signature" and "OFF" of "PDF with forced hash" are stored in the user mode storage section 1429.

Next, the user mode transmission section 1431 of the PC 1414 transmits the values and associated names of the user modes stored in the user mode storage section 1429 of the PC 1414 to the network communication section 1402 of the multifunction peripheral 1401 from the network communication section 1415 over the network 126.

When the network communication section 1402 receives the values and names of the user modes, the user mode reflection section 1410 of the multifunction peripheral 1401 updates the values of the user modes stored in the user mode storage section 1404 to the received names and values of the user modes. This causes the setting of "PDF with forced digital signature" to be changed from "OFF" to "ON" and the setting of "PDF with forced hash" to remain "OFF".

According to the present embodiment, even a multifunction peripheral incapable of receiving security policy data to change the settings of the security policy can be changed into a state compliant with the information security policies after the administrator selects the settings complying with information security policies.

Next, a fourth embodiment of the present invention will be described. The number of information security policy-related user modes of a multifunction peripheral is sometimes increased or decreased due to installation of a license or connection of an optional device thereto. It is necessary to check whether the names and values of user modes after being increased or decreased in number also comply with the information security policies. To this end, in the present embodiment, a description will be given of a method of preserving the multifunction peripheral in a state compliant with the information security policies even when the names of user modes or ranges of values which can be set are increased or decreased. Note that the same elements as those in the first embodiment are denoted by the same reference numerals, and description thereof is omitted. Only different points of the fourth embodiment from the first embodiment will be described hereafter.

Figure 18:
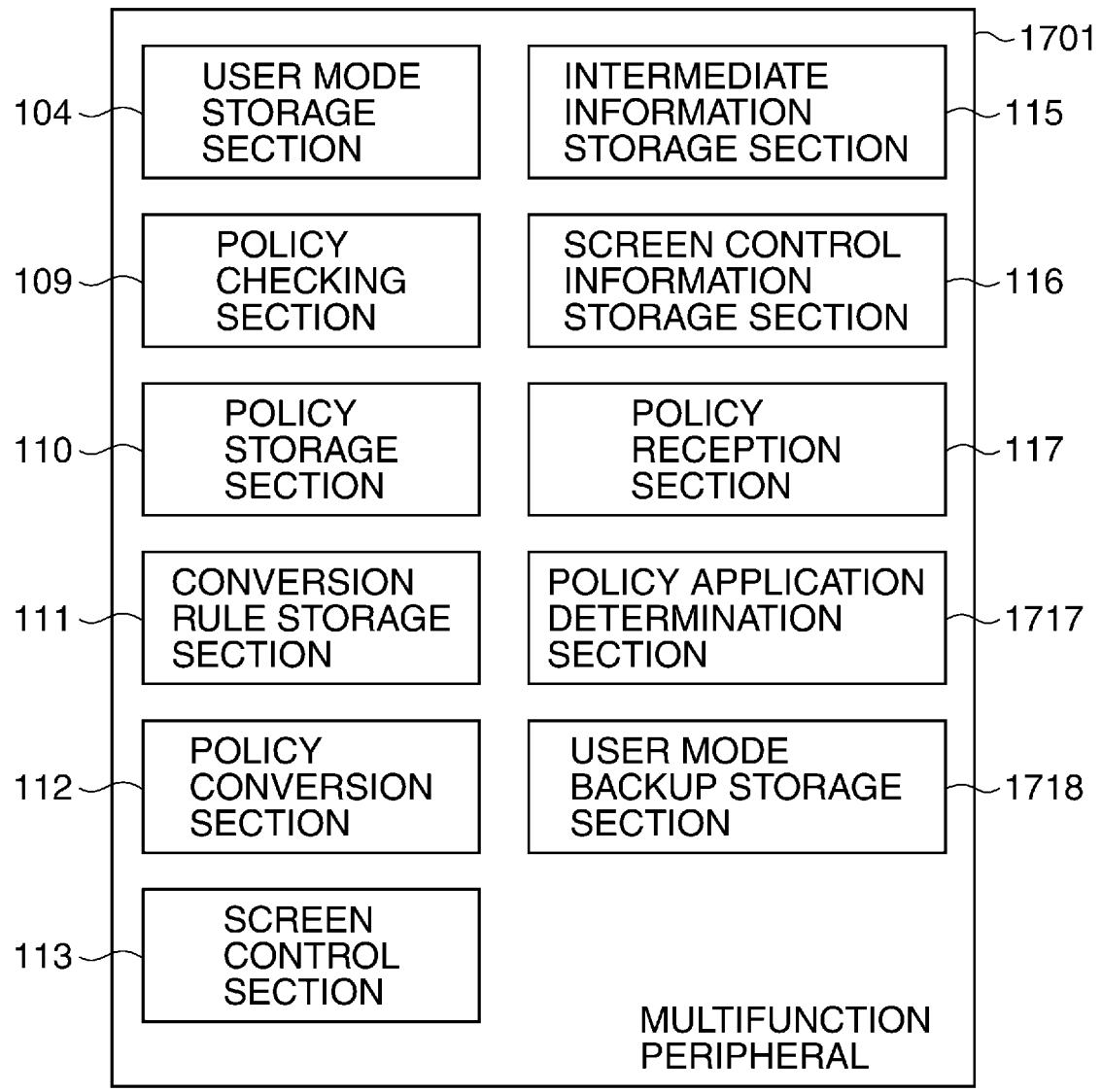
FIG. 18 A schematic block diagram showing a configuration of functions of a multifunction peripheral as an image processing apparatus according to a fourth embodiment of the present invention, which are related to control of information security policy.

FIG. 18 is a schematic block diagram showing the configuration of functions of a multifunction peripheral as an image processing apparatus according to the fourth embodiment of the present invention, which are related to control of information security policy.

The multifunction peripheral, denoted by reference numeral 1701, is different from the multifunction peripheral 101 shown in FIG. 2A, in that a policy application determination section 1717 and a user mode backup storage section 1718 are added thereto. The policy application determination section 1717 detects an increase or decrease in the number of user modes, and determines whether or not the multifunction peripheral 1701 is in a state in which it is necessary to apply information security policy data thereto. The user mode backup storage section 1718 stores the names and values of user modes to which the information security policy data have been applied. Note that the flow of processing up to the application of the information security policy data is the same as described in the first embodiment, and hence description thereof is omitted.

After the information security policy data is applied, the policy application determination section 1717 stores the names and values of the user modes in the user mode backup storage section 1718.

FIG. 19 is a flowchart of a security policy determination process executed by the policy application determination section 1717 of the multifunction peripheral 1701. Note that unless otherwise specified, this process is executed by the policy application determination section 1717 implemented by a CPU, not shown, according to a program code read from a storage device, not shown, of the multifunction peripheral 1701 into a RAM, not shown.

In a step S1801, the policy application determination section 1717 determines, upon startup of the multifunction peripheral 1701, whether or not the names and values of user modes stored in the user mode storage section 104 of the multifunction peripheral 1701 agree with the names and values of the user modes stored in the user mode backup storage section 1718. When it is determined that they agree, there is no change in the user modes, which means that the multifunction peripheral 1701 is in a state complying with the information security policies, and hence the present process is immediately terminated.

On the other hand, if it is determined that they do not agree, application of the information security policy data is executed in a step S1802. The processing for applying the information security policy data is the same as described in the first embodiment, and hence description thereof is omitted. Although the step S1801 is executed whenever the multifunction peripheral is started up, this is not limitative, but it may be executed whenever a predetermined time period elapses.

According to the present embodiment, even when the number of user modes or the range of values of settings thereof to be applied has been changed, it is possible to prevent the multifunction peripheral from being used in a state violating information security policy, since the information security policy data is immediately applied thereto in such a case.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

REFERENCE SIGNS LIST 101 multifunction peripheral
109 policy checking section
112 policy conversion section
113 screen control section
117 policy reception section
121 policy creation section
124 policy transmission section
125 PC

The invention claimed is:

1. An image processing apparatus comprising:
a hardware processor connected to a memory, the processor and memory being configured to:
store information of defining a correspondence relationship between an information security policy and settings of operations of the image processing apparatus, the information being used for converting the information security policy to the settings of operations of the image processing;
receive security policy data in which information security policy is described from an external apparatus;
convert the information security policy described in the received security policy data to the settings of the operation of the image processing apparatus based on the stored information;
compare the converted settings with the present settings of operations of the image processing apparatus;
change the present settings of operations of the image processing apparatus to the converted settings based on the comparison result;
restrict the changed settings from being changed to settings that do not comply with the information security policy descried in the security policy data.

2. The image processing apparatus according to claim 1, wherein at least one of the changed settings is a setting for an operation mode in which a signature is added to an image file generated by scanning.

3. The image processing apparatus according to claim 1, wherein at least one of the changed settings is a setting for an operation mode in which, when an image file is transmitted over a network, the image file is encrypted.

4. The image processing apparatus according to claim 1, wherein the changed settings of are identified based on the stored information.

5. The image processing apparatus according to claim 1, the processor and memory being further configured to:
determine whether or not the present operation of the image processing apparatus satisfies the information security policy; and
when it is determined that the present operation of the image processing apparatus does not satisfy the information security policy, notify that the setting of the present operation of the image processing apparatus is required to be changed.

6. The image processing apparatus according to claim 5, the processor and memory being further configured to, when it is determined that the present operation of the image processing apparatus does not satisfy the information security policy, restrict use of at least part of functions of the image processing apparatus.

7. The image processing apparatus according to claim 1, wherein the processor and memory being further configured to, when the present setting of the image processing apparatus is different from the converted setting, change the present setting of the image processing apparatus so as to comply with the information security policy.

8. The image processing apparatus according to claim 1, wherein the processor and memory being further configured to, when the information security policy described in the received security policy data is not defined by the conversion, notify an error to the external apparatus.

9. A method of controlling an image processing apparatus, comprising:
storing information of defining a correspondence relationship between an information security policy and settings of operations of the image processing apparatus, the information being used for converting the information security policy to the settings of operations of the image processing;
receiving security policy data in which information security policy is described from an external apparatus;
converting the information security policy described in the received security policy data to the settings of the operation of the image processing apparatus based on the stored information;
comparing the converted settings with the present settings of operations of the image processing apparatus;
change the present settings of operations of the image processing apparatus to the converted settings based on the comparison result;
restricting the changed settings from being changed to settings that do not comply with the information security policy descried in the security policy data.

10. A non-transitory computer-readable storage medium storing a computer-executable program that, when executed by a computer, causes the computer to perform a method of controlling an image processing apparatus, the method comprising:
storing information of defining a correspondence relationship between an information security policy and settings of operations of the image processing apparatus, the information being used for converting the information security policy to the settings of operations of the image processing;
receiving security policy data in which information security policy is described from an external apparatus;

converting the information security policy described in the received security policy data to the settings of the operation of the image processing apparatus based on the stored information;

comparing the converted settings with the present settings of operations of the image processing apparatus;

change the present settings of operations of the image processing apparatus to the converted settings based on the comparison result;

restricting the changed settings from being changed to settings that do not comply with the information security policy descried in the security policy data.

11. An image processing apparatus comprising:

a hardware processor connected to a memory, the processor and memory being configured to:

store information defining a correspondence relationship between an information security policy and setting items for an operation mode of the image processing apparatus, the information being used for determining the setting items for the operation mode of the image processing apparatus corresponding to the information security policy;

receive security policy data in which information security policy is described from an external apparatus;

determine the setting items for the operation mode of the image processing apparatus corresponding to the information security policy described in the received security policy data, based on the stored information;

set values of the setting items for the operation mode of the image processing apparatus based on the stored information; and restrict the values of the determined setting items from being changed to values that do not comply with the information security policy descried in the security policy data.

12. The image processing apparatus according to claim 11, wherein the information security policy included in the security policy center includes a name of the information security policy and a value of the information security policy, wherein setting items for an operation mode of the image processing apparatus corresponding to the name of the information security policy are determined, and wherein values of the determined setting items are set based on the value of the information security policy.

13. The image processing apparatus according to claim 12, wherein the name of the information security policy is "file tampering detection", and the setting items corresponding thereto include "PDF with forced digital signature" and "PDF with forced hash".

14. The image processing apparatus according to claim 11, wherein the name of the information security policy is "file transmission and reception method", and the setting items correspond thereto include "FTP" and "SFTIP".

15. The image processing apparatus according to claim 11, wherein the stored information is a conversion rule file.

16. The image processing apparatus according to claim 11, wherein the security policy is distributed to a plurality of image processing apparatuses which are different in type from one another.

* * * * *